US012009119B2

(12) United States Patent
Chatterton et al.

(10) Patent No.: US 12,009,119 B2
(45) Date of Patent: Jun. 11, 2024

(54) METHOD FOR INJECTING STRAND-BLOCKED CABLE

(71) Applicant: Novinium, LLC, Kent, WA (US)

(72) Inventors: Wayne J. Chatterton, Bellevue, WA (US); James Steele, Kent, WA (US); Norman E. Keitges, Renton, WA (US); David C. Busby, Midland, MI (US); Kevin Laux, Kent, WA (US); Weston Philips Chapin Ford, Seattle, WA (US); Nathanael Laurie, Burien, WA (US)

(73) Assignee: NOVINIUM, LLC, Kent, WA (US)

( * ) Notice: Subject to any disclaimer, the term of this patent is extended or adjusted under 35 U.S.C. 154(b) by 494 days.

(21) Appl. No.: 17/192,670

(22) Filed: Mar. 4, 2021

(65) Prior Publication Data

US 2021/0280341 A1 Sep. 9, 2021

Related U.S. Application Data

(60) Provisional application No. 63/145,412, filed on Feb. 3, 2021, provisional application No. 63/079,913, filed on Sep. 17, 2020, provisional application No. 62/985,637, filed on Mar. 5, 2020.

(51) Int. Cl.
*H01B 13/32* (2006.01)
*H01B 7/28* (2006.01)
*H01B 13/00* (2006.01)
*H02G 15/04* (2006.01)

(52) U.S. Cl.
CPC ......... *H01B 13/322* (2013.01); *H01B 7/2813* (2013.01); *H01B 13/0016* (2013.01); *H02G 15/04* (2013.01)

(58) Field of Classification Search
CPC .... H01B 7/285; H01B 7/2813; H01B 13/322; H01B 13/0016
See application file for complete search history.

(56) References Cited

U.S. PATENT DOCUMENTS

| | | | |
|---|---|---|---|
| 3,943,271 A | 3/1976 | Bahder et al. | |
| 4,095,039 A | 6/1978 | Thompson | |
| 4,545,133 A | 10/1985 | Fryszczyn et al. | |
| 4,703,132 A | 10/1987 | Marciano-Agostinelli et al. | |
| 4,766,011 A | 8/1988 | Vincent et al. | |
| 4,946,393 A | 8/1990 | Borgstrom et al. | |
| 4,963,695 A | 10/1990 | Marciano-Agostinelli et al. | |
| 5,049,593 A | 9/1991 | Marciano-Agostinelli et al. | |
| 5,372,841 A | 12/1994 | Kleyer et al. | |
| 6,331,353 B1 | 12/2001 | Foulger | |
| 6,697,712 B1 * | 2/2004 | Bertini | H01B 9/02 700/282 |
| 7,195,504 B2 | 3/2007 | Bertini et al. | |
| 7,344,396 B2 | 3/2008 | Stagi et al. | |
| 7,544,105 B2 | 6/2009 | Stagi et al. | |
| 7,611,748 B2 | 11/2009 | Bertini | |
| 7,615,247 B2 * | 11/2009 | Bertini | H01B 7/285 427/117 |
| 7,621,767 B2 | 11/2009 | Stagi et al. | |
| 7,658,629 B2 | 2/2010 | Stagi et al. | |
| 7,658,808 B2 | 2/2010 | Bertini et al. | |
| 7,777,131 B2 | 8/2010 | Chatterton et al. | |
| 8,205,326 B2 | 6/2012 | Bertini et al. | |
| 8,572,842 B2 * | 11/2013 | Bertini | H01B 3/20 427/117 |
| 8,656,586 B2 | 2/2014 | Bertini et al. | |
| 2003/0226677 A1 | 12/2003 | Bertini et al. | |
| 2005/0192708 A1 | 9/2005 | Bertini | |
| 2010/0122453 A1 | 5/2010 | Bertini et al. | |
| 2017/0317476 A1 | 11/2017 | Bertini et al. | |

OTHER PUBLICATIONS

ANSI/ICEA T-31-610-2018 "Test Method for Conducting Longitudinal Water Penetration Resistance Tests on Blocked Conductors" by Insulated Cable Engineers Association, Inc., 2018, 13 pages.
Banerjee, et al., "Cable Rejuvenation Practices", CEATI International Report No. T154700-50/129, Nov. 2017, 1 page.
IEEE Power & Energy Society, IEEE Std 1142-2009 "IEEE Guide for Selecting, Testing, Application, and Installation of Cables Having Radial Moisture Barriers and/or Longitudinal Water Blocking", Mar. 26, 2010, 71 pages.
Steenis, E.F. Water treeing the behavior of water trees in extruded cable insulation, Institutional Repository, Doctoral Thesis, Jun. 8, 1989, 197 pages.

* cited by examiner

*Primary Examiner* — Michael P Wieczorek
(74) *Attorney, Agent, or Firm* — Davis Wright Tremaine LLP; George C. Rondeau, Jr.

(57) ABSTRACT

A method for rejuvenating a strand-blocked cable having a conductor comprised of a plurality of conductor strands with interstitial volume therebetween blocked by a PIB based mastic, the conductor being surrounded by a polymeric cable insulation. The method comprising installing injection adapters that seal the cable ends of the cable and are usable to inject fluid into the interstitial volume between the conductor strands of the cable; elastically expanding the polymeric cable insulation through the application of pressure to the interstitial volume between the conductor strands of the cable; and injecting at least one injection fluid in which the PIB based mastic is at least partially soluble into the interstitial volume between the conductor strands of the cable. To facilitate elastic deformation of the polymeric cable insulation, the cable may be heated to and maintained at a temperature of T1 above ambient during the injection.

20 Claims, 15 Drawing Sheets

METHOD FOR INJECTING STRAND-BLOCKED CABLE

CROSS REFERENCE TO RELATED APPLICATIONS

This application claims the benefit of U.S. Provisional Patent Application No. 62/985,637, filed on Mar. 5, 2020, U.S. Provisional Patent Application No. 63/079,913, filed on Sep. 17, 2020, and U.S. Provisional Patent Application No. 63/145,412, filed on Feb. 3, 2021, the disclosures of which are incorporated herein by reference in their entirety.

BACKGROUND OF THE INVENTION

Field of the Invention

The present invention relates to silane injection of solid dielectric medium-voltage power cables manufactured with primarily polyisobutylene (PIB) based longitudinal strand-blocked mastic between the conductor strands.

Description of the Related Art

Power Cable:

Power cables are generally constructed by a metallic conductor surrounded by polymeric insulation. For the purpose of illustration, a medium voltage power cable 100 is shown in FIG. 1. Typical construction for the medium voltage power cable 100 comprises a conductor 102 made of aluminum or copper. Often the conductor 102 will be comprised of multiple individual conductor strands 104 that are arranged in concentric layers. The space between the individual conductor strands is known as the interstitial volume 106. Surrounding the conductor is a conductor shield 108, a semi-conducting layer often included in the design of medium and high-voltage power cables to reduce electrical stress in the insulation. Surrounding the conductor or conductor shield is insulation 110 that has a substantial dielectric strength and is typically made of polyethylene (PE), cross-linked polyethylene (XLPE) or ethylene-propylene rubber (EPR). Surrounding the insulation 110 is an insulation shield 112, a second semi-conducting layer often included in medium and high-voltage power cables to reduce electrical stress in the insulation. Surrounding the insulation shield 112 is a ground 114 used to carry stray current and drain capacitive charge from the cable. The ground 114 may consist of multiple conductors arranged circumferentially around the cable called concentric neutrals 116. The outermost layer of the cable is the optional jacket 118 that provides mechanical protection to the cable. The construction of medium-voltage cable rated from 5 kV to 46 kV is further described in ICEA S-94-649-2000. While a medium voltage power cable with a jacketed concentric neutral construction has been shown, it should be appreciated that other forms of power cable exist, such as bare-concentric cable, tape-shield cable, low voltage cable, armored cable, submarine cable and high-voltage cable. Such cables may see the addition of elements such as armor or the subtraction of elements such as semi-conductive shields or neutrals.

Aging Mechanisms for MV Power Cables:

There are a number of phenomena that can "age" medium-voltage cable insulation. The most damaging of these is the diffusion of water from the ground through the jacket and insulation shield and into the insulation. Once in the insulation, the water can oxidize the PE, XLPE or EPR and result in a phenomenon known as water treeing occurring. [Steenis, E. F., (1989) Water Treeing the Behavior of Water Trees in Extruded Cable Insulation, 201 p]. These water trees look like microscopic trees in the insulation, and they can grow from either of the two semi-conductive shields or can initiate within the insulation and grow radially towards the semi-conductive shields in the shape of a bowtie. Left untreated, these "water trees" grow in the insulation and lead to premature cable failure.

The life of the cable in the ground is directly related to the health of the insulation layer.

Rejuvenating Power Cables:

The space between the conductor strands is known as the interstitial region. First practiced in the 1980's, cable rejuvenation increases the cable insulation's dielectric strength by injecting water reactive alkoxysilanes into the interstitial region of the conductor [U.S. Pat. Nos. 7,615,247 and 7,611,748]. The fluid traverses from the near end of the cable to the far end of the cable. The fluid then diffuses radially from the interstitial region into the insulation. The fluid raises the dielectric strength of the insulation and reacts with water, effectively treating the water trees. As it reacts, the fluid becomes an oligomer decreasing its rate of diffusion by orders of magnitude, allowing the fluid to dwell in the cable for an extended period of time. Treating these water trees increases the remaining life of the cable by many years.

The typical injection process is as follows. The cable is de-energized and new terminations are placed on each end. The cable is checked for neutral condition and a slight positive flow of air is placed on the cable to ensure flow from one end of the cable to the other. The cable is then injected with the treatment fluid from the near end, and when the fluid arrives at the far end and fills the interstitial region, the cable is considered injected and is put back in service.

Cable Rejuvenation Methods:

Today, there are two primary methods of cable rejuvenation in commercial practice with both being well documented in literature [Banerjee, et al, "Cable Rejuvenation Practices," CEATI Report No. T154700-50/129, November 2017].

The first method known as improved un-sustained pressure rejuvenation (iUPR) relies on a continuous flow path being present in the conductor and uses it as the reservoir to house the injection treatment for treating the insulation. This method has been well described in literature, including U.S. Pat. Nos. 4,766,011 and 5,372,841.

The second method known as sustained pressure rejuvenation (SPR) creates additional interstitial volume through elastic expansion and increases flow rate due to the use of moderate pressure [U.S. Pat. Nos. 7,615,247 and 7,611,748].

Further improvement as disclosed in U.S. Pat. No. 8,572,842 includes the application of thermally enhanced rejuvenation (TER) to create interstitial volume through a combination of thermal expansion at an elevated temperature and elastic expansion due to a moderate pressure.

Strand Block Cables:

In the 1980's, cable manufacturers began incorporating strand-filling compounds into the conductors of medium voltage cable that filled the interstitial spaces and restricted water migrating along the length of cable. Strand blocking materials are a proprietary mixture for each manufacturer, but typical formulations will consist of polyisobutylene (PIB) and about 40-50% carbon black filler to help smooth the electrical field. Today, almost 90% of medium voltage cables manufactured are strand filled according to industry surveys. However, field experience shows strand blocked cables perform similarly to non-strand filled cables of like construction and vintage in terms of AC-breakdown performance and are still susceptible to water-tree aging and failures.

One of the unfortunate side effects of strand-blocking the conductor is that it renders the population of cable uninjectable by existing methods. The strand-blocking compound effectively fills the interstitial space of the cable's conductor and blocks the injection of rejuvenation fluids. Consequently, circuit owners must turn to cable replacement when strand-blocked cables age due to water trees and the AC breakdown strength of the cable drops to unacceptable levels. Today, after nearly 40 years of strand-blocked cable installation, there are billions of feet of strand-blocked cable in operation, the oldest of which is at or nearing its end of life. There is a need for a new injection process to address water trees in strand-blocked cable.

From the original Bahder patent (U.S. Pat. No. 3,943,271) to modern concept (U.S. Pat. Nos. 4,095,039, 4,703,132, 4,963,695, and 6,331,353, for example), it has been known that keeping cables dry is the only way to ensure long cable life. Bahder determined that water caused a shortening of life through the growth of water trees, as described above, and that water intrusion during manufacture or after the cable was buried leads to a reduction in cable life. This led to the adoption of jackets on cables to keep water out of the insulation and a strand blocked mastic in the conductor to impede water flow along the conductor. There had been many early attempts to impede water and many formulas of mastic employed to prevent flow of fluid down the interstitial region of the cable. Today, with few exceptions, all strand-block mastic is manufactured by Chase Corporation. This material is stable, works well in the electrical field and is employed during the manufacture of cables. It easily passes industry standard tests (like ICEA T31-610) and has been used successfully for more than 25 years. The general industry belief is that if one blocks the migration of water in the conductor then the cable life will be extended as water trees cannot be formed without water.

Chase A162A strand block mastic was introduced to the MV Power Cable Industry in 1990 and has been effectively used since (see Table 1). This material is sold under the name A162A BIH2Ock. Pre-1990 materials used by manufacturers (Excl. Pirelli Cables) were materials formulated in-house by material chemists. Chemists in the solar industry use similar formulas to seal solar panels to boards and electronics. Pirelli used an in-house developed polyisobutylene (PIB) based material supplied by United Technologies of St. Louis, MO. However, industry experts have confirmed that all mastic formulations are very similar and have very similar physical properties.

TABLE 1

Formulation & Proportions: Polyisobutylene (PIB) - based; Exxon Chemicals Americas.

| Ingredient | Weight % | Specific Gravity | Specific Volume | Tolerance (+/-), % |
|---|---|---|---|---|
| Vistanex LM-MS | 59.41 | 0.914 | 109.409 | 1.00 |
| Irganox 1010 | 0.99 | 1.15 | 1.449 | 10.00 |
| Graphite | 39.60 | 2.26 | 29.499 | 1.00 |
| Total | 100.00 | 1.199 | 140.357 | |

Conventional Injection Methods are not suitable:

The industry has created and accepted ANSI/ICEA T31-610 "Test Method for Conducting Longitudinal Water Penetration Resistance Tests on Blocked Conductors" and IEEE 1142-2009 "IEEE Guide for Selecting, Testing, Application, and Installation of Cables Having Radial Moisture Barriers and/or Longitudinal Water Blocking" as tests to ensure cables have an adequately blocked conductor.

Due to the absence of free interstitial volume in strand-blocked cable, lack of continuous flow path and physical properties of the strand block material, conventional injection methods as described in U.S. Pat. No. 7,615,247, "Method for treating electrical cable at sustained elevated pressure," U.S. Pat. No. 8,205,326, "Method for treating electrical cable at sustained elevated pressure," U.S. Pat. No. 8,656,586, "Method for treating electrical cable at sustained elevated pressure," and U.S. Pat. No. 8,572,842, "Method for thermally enhancing injection of power cable," are not suitable as currently practiced for strand blocked cable.

A new method to inject these power cables manufactured with PIB based strand block materials is necessary. It is desirable to inject a cable's conductor with enough fluid volume to provide protection to the insulation for a duration similar to the treatment of non-strand blocked cable. It is further desirable to minimize the time spent to inject a given cable by reducing the flow resistance imposed by the strand block material.

DETAILED DESCRIPTION OF THE INVENTION

Figure 1:
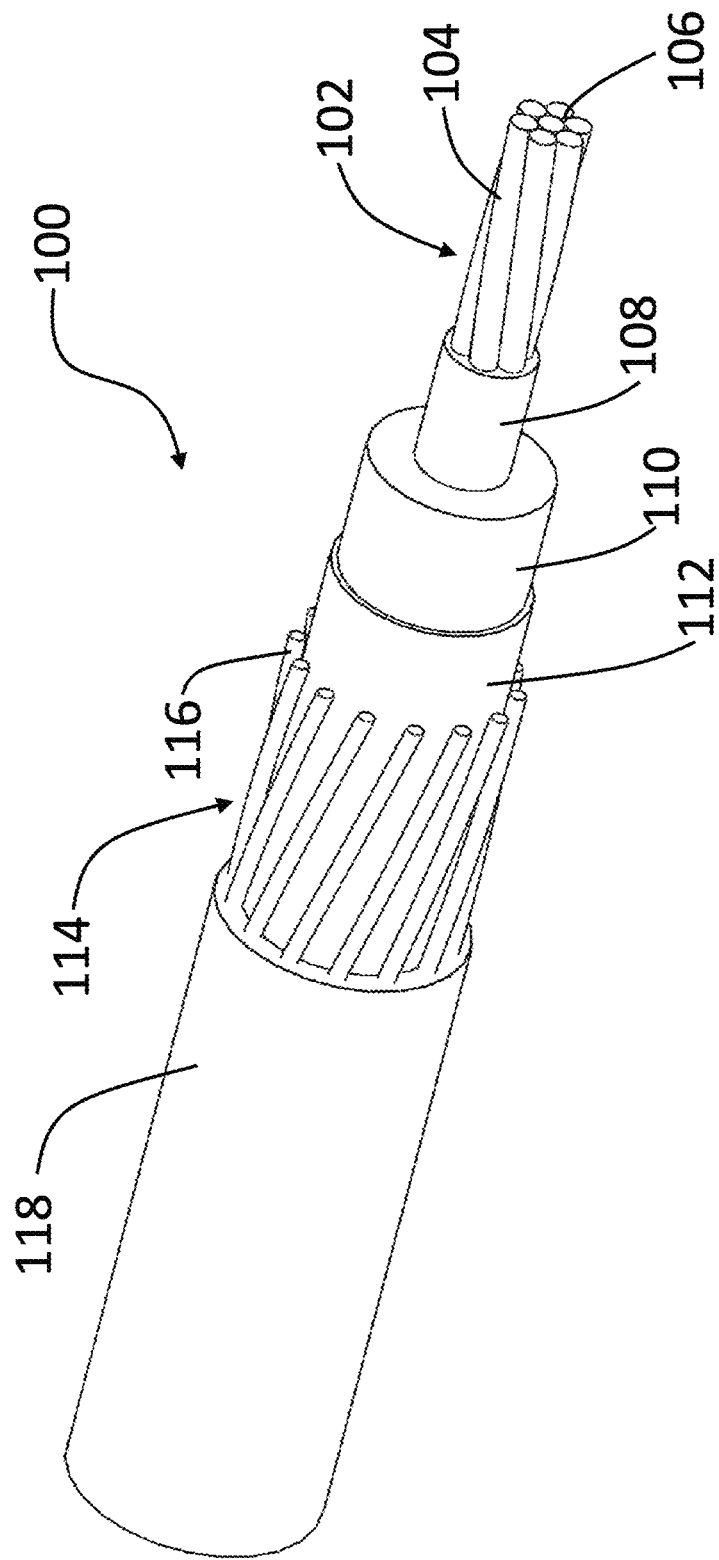
FIG. 1 illustrates a typical prior art medium voltage cable construction.

A new injection protocol that addresses the population of cables manufactured with primarily PIB based longitudinal strand block material is herein disclosed. The disclosed method may include:

a. the injection into the cable conductor of a rejuvenation fluid in which PIB-based strand block mastic is, at least in part, soluble, b. the application of pressure and/or temperature to the cable to elastically expand the insulation and establish a flow path through the cable, and c. the installation of injection adapters to seal the cable's ends and provide fluid access to the conductor of the cable that do not unduly limit radial thermal expansion of the cable.

Creating a Flow Path through Elastic Expansion:

The injection of solid dielectric cables through the elastic expansion of the insulating jacket has been well documented in U.S. Pat. Nos. 7,615,247, 7,611,748, and 8,572,842. However, strand-block cables introduce a new element into the cable design that brings with it new challenges for injection that were unanticipated by the prior art.

While the composition of PIB-based longitudinal strand block mastic has been previously disclosed in literature, little is known about the physical properties of PIB-based strand block materials. An understanding of the physical properties will allow the injection technician to better select the combination of temperature and pressure in which to perform injection on strand block cable. These physical properties include the viscosity and glass transition temperature for various strand block mastic materials.

Glass Transition Temperature (Tg):

Differential Scanning Calorimetry (DSC) was performed on strand block (SB) mastic samples collected from five cable manufacturers including Southwire 2017, Pirelli 1987, Hendrix 2012, Prysmian 2009 and Okonite 2018. All cables were XLPE insulated with the exception of the Okonite sample which was EPR insulated.

Samples were tested using a Mettler Toledo model DSC 3+. The parameters for testing began at −90° C. That temperature was held for 2 minutes to ensure the sample had thermally equalized. At a rate of 10° C. per minute, the chamber was heated to 90° C., held for 1 minute then cooled at the same rate back to −90° C. This temperature cycle was performed twice for each sample. The first temperature cycle of a polymer sample often contains the thermal history of the material which is then erased in subsequent cycles.

The four mastic samples show similar features especially in the second cycle when thermal history has been erased. All mastic samples show a characteristic endothermic peak near −70° C. This peak corresponds to the glass-transition temperature (Tg) for polyisobutylene rubber (PIB). The onset temperature and peak temperature were recorded and can be seen in Table 2.

TABLE 2

Glass Transition Temperature for various strand block mastics

| | Glass-Transition Temperature (Tg) - ° C. | | | |
| --- | --- | --- | --- | --- |
| Sample | Tg Onset - First Cycle | Tg Onset - Second Cycle | Tg Peak - First Cycle | Tg Peak - Second Cycle |
| Pirelli-1987 | −69.16 | −68.97 | −66.81 | −66.34 |
| Southwire-2017 | −72.26 | −73.05 | −70.85 | −71.56 |
| Hendrix-2012 | −72.75 | −73.28 | −71.21 | −71.47 |
| Prysmian-2009 | −70.01 | −70.23 | −68.49 | −68.35 |

Viscosity:

An Anton Paar MCR302 rheometer was used to measure flow characteristics of various strand block samples collected from new and field-aged cables. The rheometer used the parallel plate method at a constant torque of 0.01 Nm and measured the resistance to flow, or viscosity, of the mastic. Measurements were taken in 5° C. increments from 100° C. down to 40° C.

Figure 2:
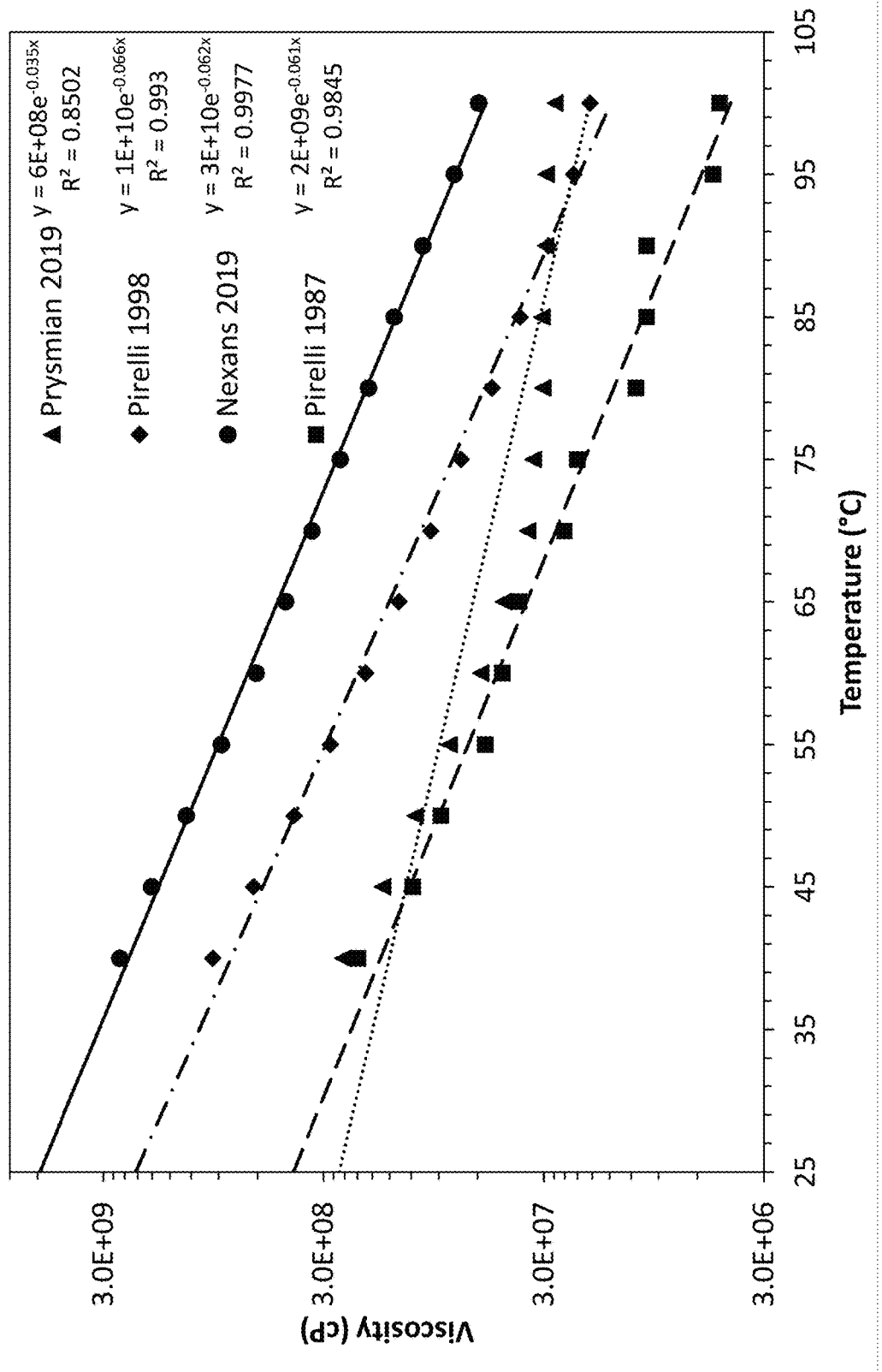
FIG. 2 illustrates viscosity curves for various strand block mastics.

The data are shown in FIG. 2 with the rheometer platen temperature on the X-axis and the log of viscosity on the Y-axis. Exponential fitted lines with R-squared values and equations are shown for each sample. Fitted lines were extrapolated to 25° C. to show the viscosity near room temperature. From 40° C. to 70° C. all samples follow the same exponential decrease in viscosity as the temperature increases. The same is also true up to 100° C. for all samples except the Prysmian 2019, which showed some instability at higher temperatures.

During the collection process it was noted that strand-block materials varied in adhesion, notably the Nexans 2019 mastic was the stickiest. The data reveals that for a given temperature, the viscosity difference between samples can vary by more than one order of magnitude. This variation is attributed to the difference in molecular weight of the PIB and specific concentration of carbon black. The data also reveals that mastics tend to experience about an order of magnitude change in viscosity for every 40° C. change in temperature.

Carbon Black Content:

In addition to molecular weight of the PIB, carbon black is known to have influence on the physical properties of mastics. A weighed portion of mastic (16.3579 g) was added to about 3 times as much weight of toluene, and the mixture was dissolved by shaking and heating in a 55° C. oven. The black suspension in yellow liquid was filtered through a weighed medium fritted filter funnel to trap the carbon black. The carbon black was washed on the filter frit with additional toluene to remove any remaining PIB. The carbon black was then washed with acetone and dried by pulling air through the frit for 1 hour. The frit was then placed in a 55° C. oven to remove any remaining solvent, and then the frit plus carbon black was weighed. The weight of the carbon black recovered was 7.9444 g or 48.6 wt % of the initial weight of mastic. This value is significantly higher than the 39.6 wt % documented by industry. This variation likely explains some of the differences observed between strand block materials of various cable manufacturers and vintages.

The understanding of the PIB-based strand block mastic's physical properties can be applied to create an injection protocol tailored to strand block cables. The thermally enhanced rejuvenation (TER) process disclosed by U.S. Pat. No. 8,572,842 can be optimized for strand block cable by seeing an increase in conductor temperature that is sufficient to reduce the viscosity of the strand block mastic by at least an order of magnitude to encourage flow. The example below demonstrates how strand block cable can be injected.

Example 1

A variety of strand blocked cable samples were selected for testing as described in Table 3. A visual inspection was performed on all samples during craftwork to confirm the presence and type of strand-block material between the strands.

TABLE 3

Description of cable samples.

| Sample | Cable Manufacturer | Cable Vintage | Conductor Size (AWG) | Strand Block Type | Insulation | Length (ft) |
|---|---|---|---|---|---|---|
| 1 | Hendrix | 2018 | 1/0 | PIB | 15 kV, 220 mil XPE | 22 |
| 2 | Okonite | 2019 | 1/0 | PIB/EPR | 25 kV, 260 mil EPR | 12 |
| 3 | Prysmian | 2019 | 1/0 | PIB | 15 kV 175 mil XLPE | 100 |
| 4 | Hendrix | 2019 | 1/0 | PIB | 15 kV 175 mil XLPE | 314 |
| 5 | Pirelli | 2005 | 1/0 | PIB | 15 kV 220 mil XLPE | 8.5 |
| 6 | CABLEC | Early 2000s | 1/0 | PIB | 15 kV 175 mil XLPE | 16 |
| 7 | Pirelli | 1996 | 1/0 | PIB | 25 kV 295 mil XLPE | 8.3 |

Figure 3:
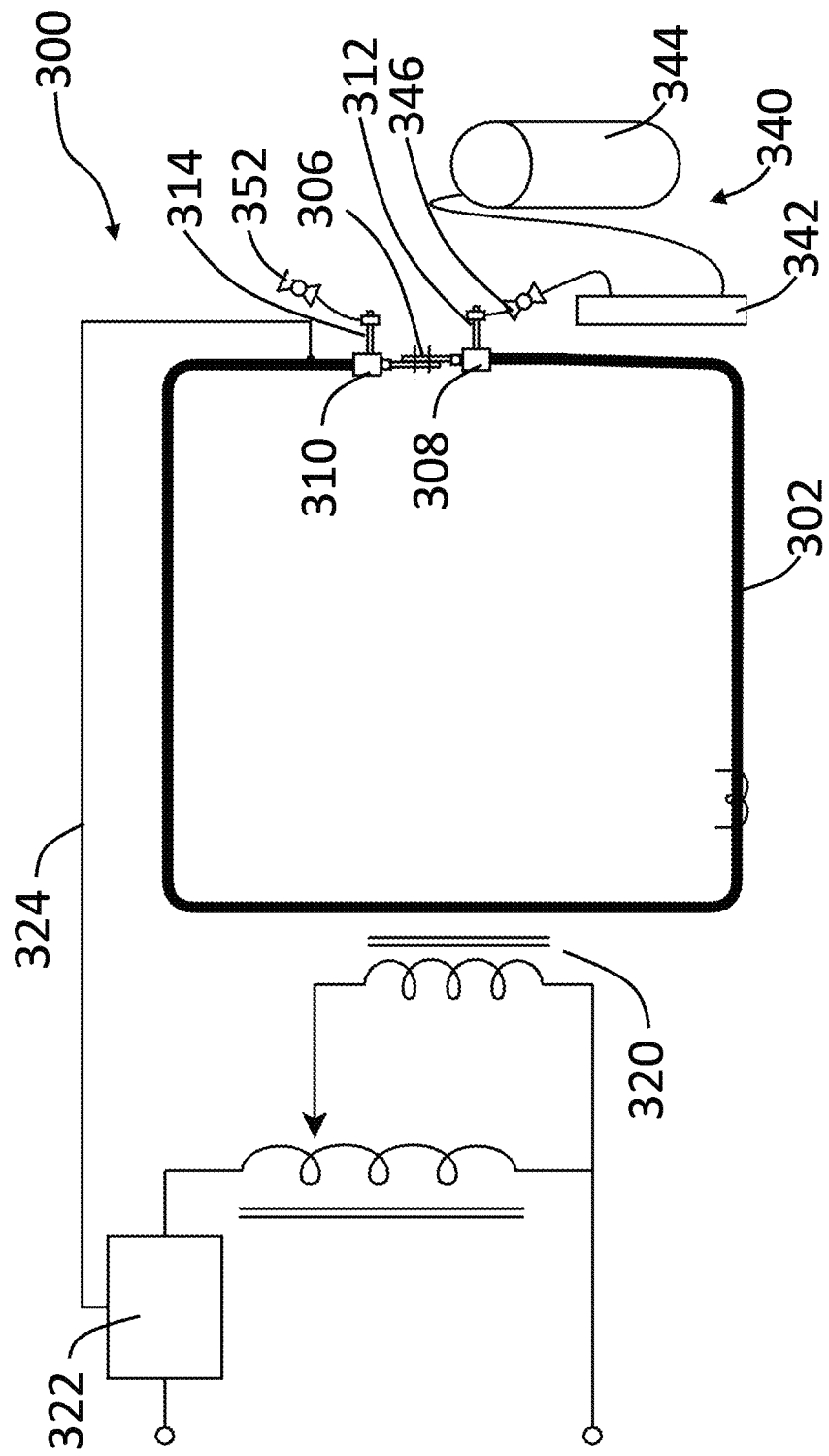
FIG. 3 is a test setup using an AC transformer to drive current.
Figure 4:
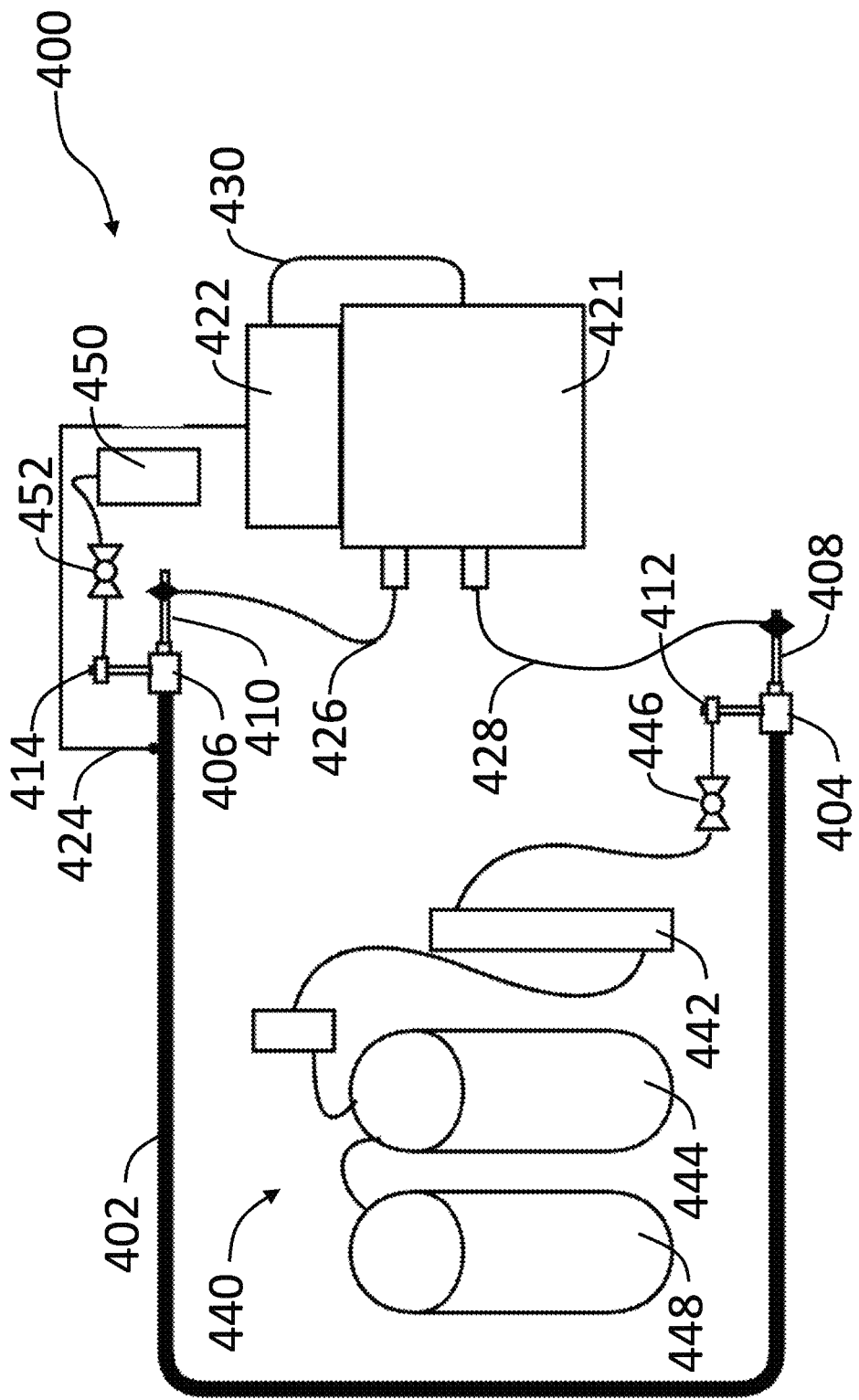
FIG. 4 is a test setup using a DC current supply.

The samples were prepared for testing and installed in either the AC transformer setup in FIG. 3 or the DC current supply setup in FIG. 4.

Referring to FIG. 3, a test setup 300 is comprised of a cable sample 302 with its terminations joined together to form a loop 306. The loop of cable passes through the coils of a current transformer 320 to incite current flow. The current transformer is connected to a temperature controller 322, which monitors the temperature of the cable sample 302 through test lead 324 and provides on/off control of current transformer 320. The cable terminations are both sealed by injection adapters 308 and 310, which are connected to injection tools 312 and 314, used to provide fluid access to the injection adapter. The feed side of the cable is connected to a feed assembly 340 through a ball valve 346. The feed assembly 340 is further comprised of a fluid flow meter 342 and a fluid injection tank 344. The receiving side of the cable is connected to a ball valve 352. The ball valve can be connected to a catch tank (not shown).

In FIG. 4, test setup 400 is comprised of a cable sample 402 arranged in a U shape. The cable sample is terminated at both ends with electrical connectors 408 and 410 and injection adapters 404 and 406, respectively, to make the fluid seal. A DC current supply 421 is connected to each end of the cable sample through interconnect cables 426 and 428 to complete the circuit. The DC current supply is connected to a temperature controller 422 through interconnect 430 to provide on/off control of the current. The temperature controller is joined to the cable sample through test lead 424 to monitor temperature. Injection tools 412 and 414 are used to provide fluid access to the injection adapters on the feed side and receiving side of the cable sample, respectively. The feed side of the cable is connected to a feed assembly 440 through a ball valve 446. The feed assembly is comprised of a fluid flow meter 442, a fluid injection tank 444 and a compressed gas cylinder 448. The receiving side of the cable is connected to a catch tank 450 through a ball valve 452.

The terminations of the cable were prepared with injection adapters installed over 2-hole lugs to seal the ends of the cable. Injection tools were connected to the injection adapters to allow for the injection of fluid into the cable conductor. The terminated cables were installed into the test setup and a temperature sensor was used to monitor cable temperature and relay the reading back to a temperature control switch. For the purpose of this example, a conductor temperature of between 50 and 75° C. was sought and an induced current of 200 to 350 amps was used to reach the set temperature. (Typical cable insulations are rated to run at 90° C., with emergency operation up to 130° C. on certain cables.) When the set temperature was achieved in the cable, the temperature controller would switch current off until the cable temperature dropped back below the lower set point. The tests were performed with an ambient temperature that ranged from between 13 to 22° C.

The test results are summarized in Table 4. For Samples 1 and 2, a moderate pressure of 50 to 75 psi was selected, and $CO_2$ was first injected into the cable to establish a flow path. Initially, no flow was observed. The current transformer was switched on, and the current quickly warmed the conductor through resistive heating. After approximately 10 minutes of heating and a sustained pressure, flow of $CO_2$ was observed through the cable. The $CO_2$ supply was replaced with a supply of cable rejuvenation fluid and pressurized to the injection pressure. For this test, the commercially available fluid Cablecure 732 was selected that primarily consists of tolylethylmethyldimethoxysilane (TEM), Cyanobutylmethyldimethoxysilane (CBM), and hydrolysis condensation catalyst. The results again showed flow through the strand-filled conductor with rejuvenation fluid collected at the far end of the cable less than 1 minute after the start of injection. Finally, the current supply was turned off and the cable was allowed to cool. During the cool down process, fluid flow exiting the cable was reduced and eventually, the strand fill returned to blocking flow through the strands.

For samples 3 through 7, the pre-injection of $CO_2$ was forgone. Set temperatures ranged between 50 and 70° C., and an injection pressure of 100 psi was used. Cables were first brought up to temperature prior to starting the flow of fluid. Injection times ranged between 30 minutes and 3 hours. Overall, the fluid volume injected into the cable ranged between 0.5 and 2.6 cc/ft excluding the one EPR sample. For a typical injection of a non-strand blocked cable with a similar conductor size, the fluid volume would typically range about 2.5 to 3.9 cc/ft.

TABLE 4

Test Results for Example 1

| No. | Cable Manufacturer | Cable Vintage | Conductor Temperature (° C.) | Injection Pressure (psi) | Injection Fluid | Injection Duration (hrs) | Injected Volume (cc/ft) | Injection Duration for 300 ft (hrs) |
|---|---|---|---|---|---|---|---|---|
| 1 | Hendrix | 2018 | 55 | 75 | $CO_2$, 732/40 | 0.2 | 2.6 | 2.7 |
| 2 | Okonite | 2019 | 50 | 50 | $CO_2$, 732/40 | 0.2 | 3.6 | 5.0 |
| 3 | Prysmian | 2019 | 65 | 100 | 732/80 | 2.5 | 0.8 | 7.5 |
| 4 | Hendrix | 2019 | 50 | 100 | 732/80 | 3.0 | 2.3 | 2.9 |
| 5 | Pirelli | 2005 | 70 | 100 | 732/80 | 0.5 | 0.5 | 17.6 |
| 6 | Cablec | Early 2000s | 60 | 100 | 732/80 | 0.5 | 1.2 | 9.4 |
| 7 | Pirelli | 1996 | 65 | 100 | 732/80 | 0.5 | n/a | 16.6 |

To reduce this discrepancy in injection volume between the cable samples of different makes and vintages, supplemental fluid could be soaked into the cable over a short period of time. Such practices have been employed at ambient temperature and pressures typically under 30 psi. However, cable temperature and fluid pressure could be used to accelerate diffusion of the fluid into the insulation. When fluid reaches the catch tank as shown in FIG. 4, the valve may be closed and the soak period can begin. The feed tank will continue to supply fluid to the strand blocked cable until a treatment floor or treatment target has been reached. For the example of the I/O AWG 15 kV cable injected in Example 1, such a floor could be 2.4 cc/ft or 75% of the treatment target for non-strand filled cable of similar construction. Further, the floor could be 3.2 cc/ft or 100% of the treatment target for non-strand filled cable of similar construction. When the treatment floor is reached, the feed tank may be disconnected from the injection adapter.

For comparison, the injection times recorded for each cable sample were used to extrapolate the injection times for an average cable length of 300 ft. The results varied between under 3 hours to over 17 hours.

An injection protocol for strand block cable should include an increase in cable temperature of about 40° C. over ambient to reduce the viscosity of the PIB-based strand block material by about 10 times. However, in some cases and dependent on the physical properties of mastic, a reduction of 5 times may be sufficient. The pressure is selected to be below the elastic limit of the cable and preferably between 25 and 50% of the elastic limit.

In one embodiment, the cable temperature is increased by about 20° C. over ambient T0 to T1 for injection. Specifically, T1 is about 40° C. assuming ambient is about 20° C. The pressure is selected to be below the elastic limit of the cable and preferably between 25 and 50% of the elastic limit.

In another embodiment, the cable temperature is increased by about 40° C. over ambient T0 to T1 for injection. Specifically, T1 is about 55° C. assuming ambient is about 15° C. The pressure is selected to be below the elastic limit of the cable and preferably between 25 and 50% of the elastic limit.

In yet another embodiment, the cable temperature is increased by about 20° C. to T1 over ambient T0 for injection. Once the conductor is filled, the outlet is closed at cable end 2, the temperature is increased to T2 for an extended soak period while the injection fluid diffuses into the cable from cable end 1. In this embodiment, T2>=T1. Specifically, T1 is about 35° C., T2 is >=T1 assuming ambient is about 15° C. As an example, T2 is about 55° C. The pressure is selected to be below the elastic limit of the cable and preferably between 25 and 50% of the elastic limit.

Accounting for Thermal Expansion at the Terminations:

Injection adapters and connectors installed for the purpose of cable injection are well documented in prior art, including U.S. Pat. Nos. 4,946,393, 7,195,504, and 7,344,396. The prior art assumes the cable is non-strand filled, the conductor is capable of receiving rejuvenation fluid and able to facilitate flow of the fluid through the entire length of cable to the far termination.

In the case of PIB based longitudinal strand blocked cable, however, a pre-existing fluid pathway is not present. Rather, a flow path must be created through a unique injection protocol.

Thermal expansion as incited by the practice of U.S. Pat. No. 8,572,842 may be used to increase the interstitial spaces in the conductor strand bundle, reducing flow restriction and improving injection performance. As shown, the polyethylene expands at a rate of 5 to 10 times more than the aluminum conductor. And further, polyethylene expands at a rate of 7 to 13 times more than the stainless steel injection adapter that is often used to seal on the outer surface of the insulation.

Figure 5:
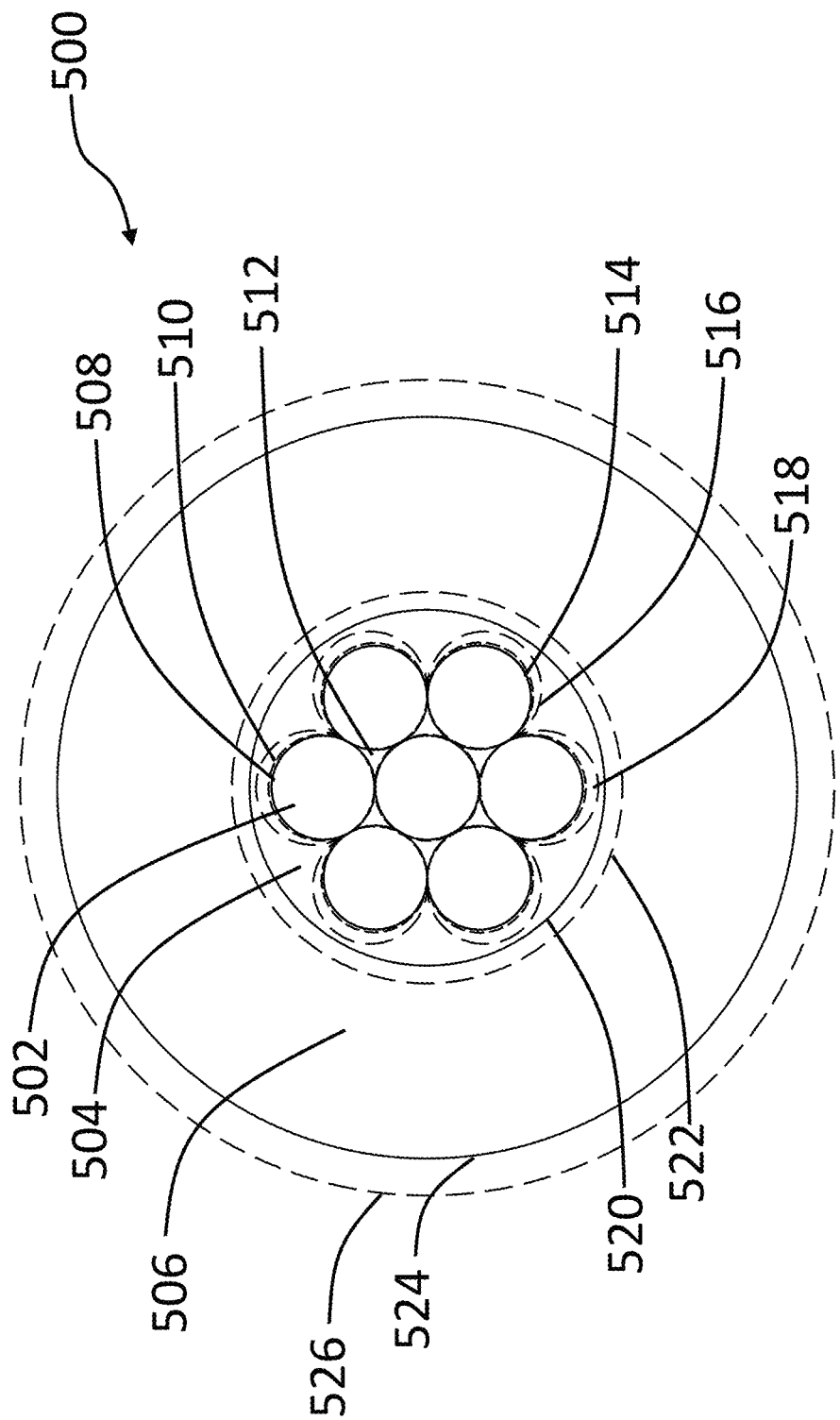
FIG. 5 illustrates the effects of thermal expansion on a cable cross section (#2 AWG).

A thermal expansion model was created to illustrate additional flow path created by a 40° C. rise in temperature using the thermal expansion coefficients provided in Table 5. Referring to FIG. 5, a cable 500 is comprised of a conductor 502, a conductor shield 504 and an insulation 506. Conductor 502 is comprised of 7 conductor strands and defined by perimeter 508 in its cooled state. When a temperature rise of 40° C. is modeled, the conductor expands according to the thermal expansion coefficient found in Table 5 for aluminum. In its heated state, conductor 502 is defined by perimeter 510 and the interstitial volume 512 is increased. Conductor shield 504 is defined by perimeter 514 along the surface of the conductor and perimeter 520 adjacent to the insulation. When a temperature rise of 40° C. is modeled, the conductor shield expands according to the thermal expansion coefficient found in Table 5 for polyethylene. In its heated state, conductor shield 504 is defined by perimeters 516 and 522. In this state, additional volume 518 is created between the conductor and conductor shield that can be used for injection of a strand-blocked cable. The insulation's outer surface is defined by perimeter 524 in the initial state and perimeter 526 in the heated state.

TABLE 5

Thermal expansion coefficients for polyethylene, aluminum and steel commonly used in injection adapters.

| Material | Thermal expansion coefficient ($10^{-6}$/° C.) |
|---|---|
| Aluminum | 24 |
| 303 Stainless Steel | 15 |
| Polyethylene | 108-200 |

Figure 6:
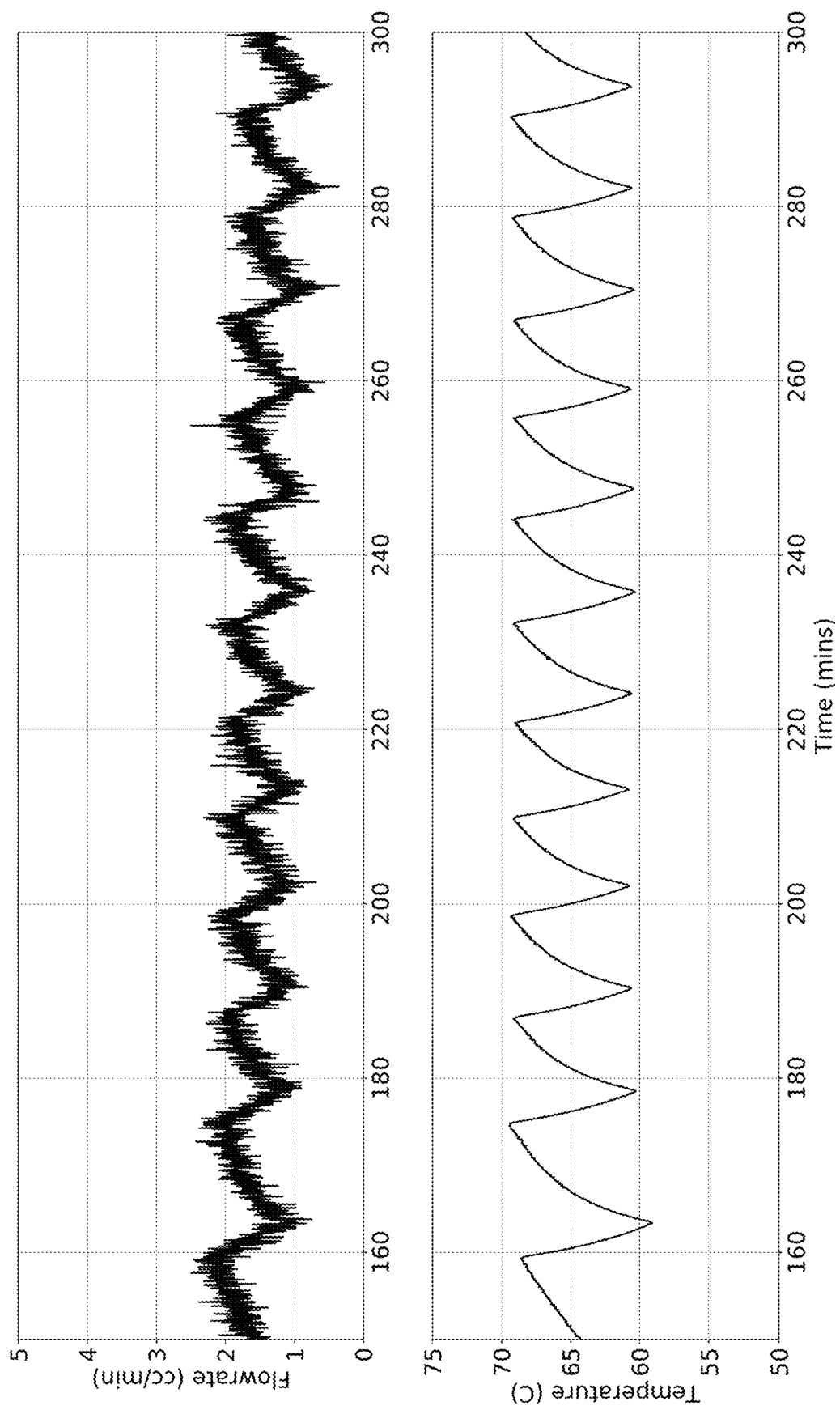
FIG. 6 is sample injection data including cable current, injection pressure, conductor temperature and fluid flow rate where the flow is seen to sawtooth in connection to current.

Testing like that discussed in Example 1 reveals surprising insight into the flow restrictions posed by strand-blocked cable. In many cases, the flow rate was noted to oscillate as illustrated in FIG. 6. Surprisingly, peak flow rate actually tended to correspond with periods when the cable temperature was near the bottom threshold indicating that thermal expansion may be influencing flow in other ways.

The flow resistance of a strand-blocked cable is the sum of all parts of the fluid system and can be broken down to component level. This will include the injection adapters installed at the terminations of the strand blocked cable and includes the electrical connectors and the fluid seals. The system also includes the per unit length flow resistance of the strand blocked cable itself and the physical properties of the injection fluid used for rejuvenation, most importantly viscosity.

Figure 7:
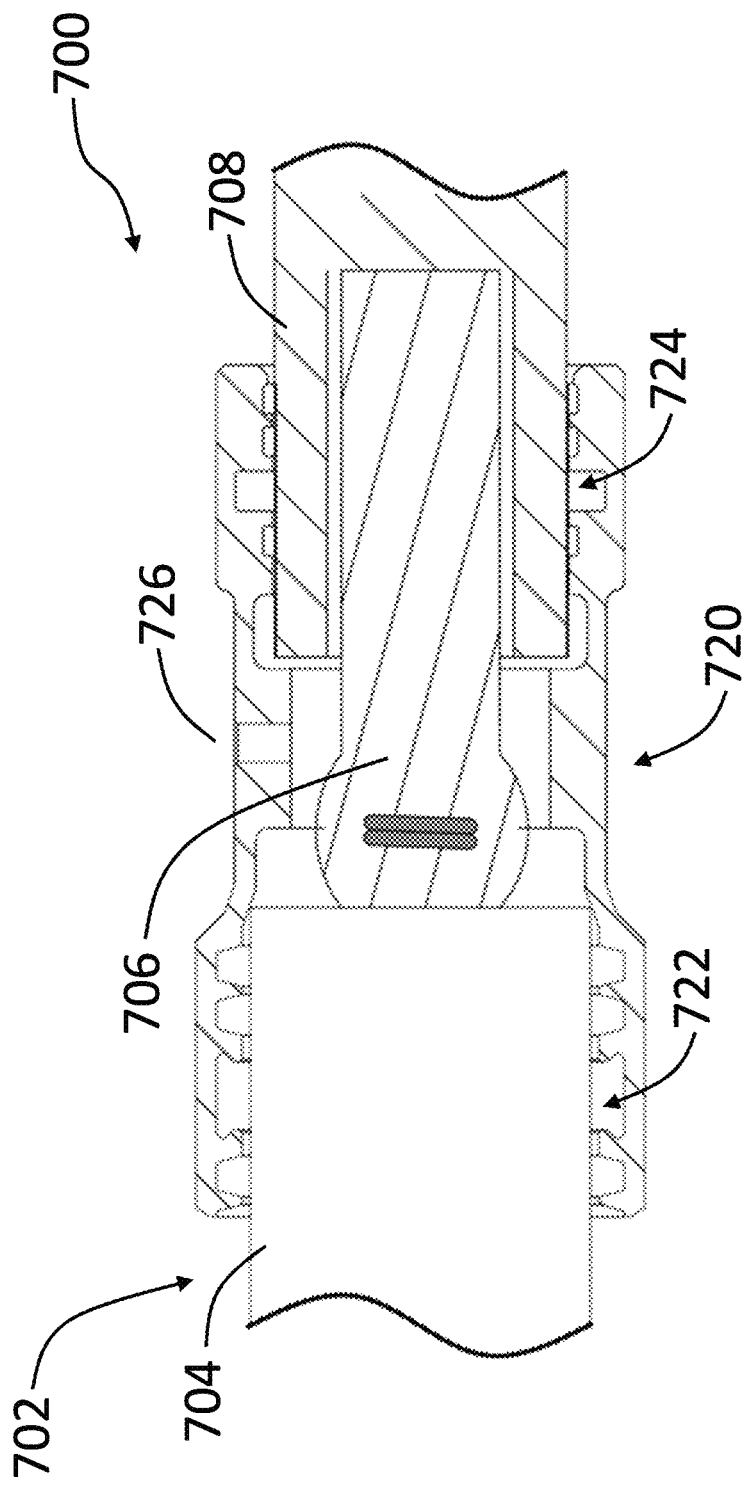
FIG. 7 is a cross section view of an injection adapter used to seal cable ends, provide fluid access and form electrical connections for the cable.
Figure 7A:
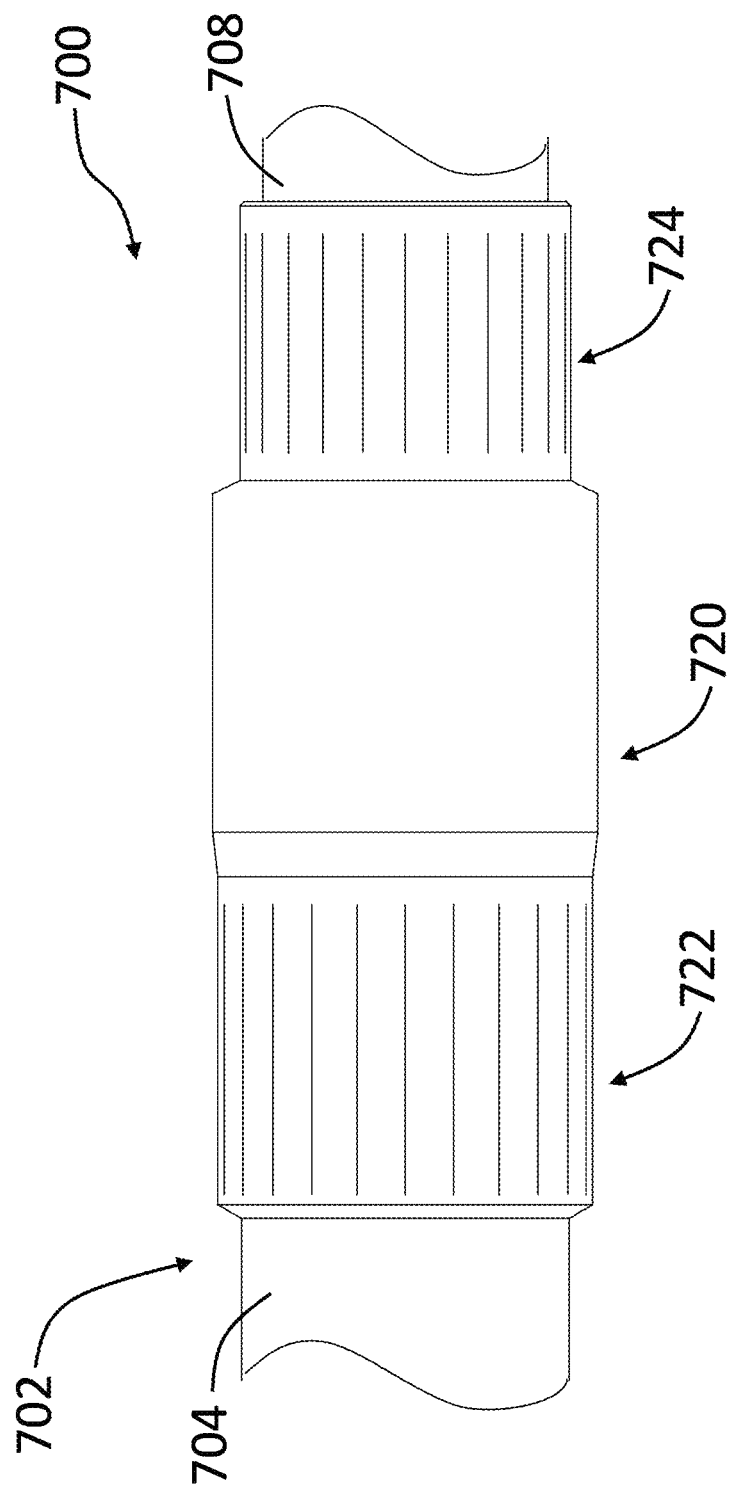
FIG. 7A is a side view of an injection adapter compressed onto the insulation of the cable, used to seal cable ends, provide fluid access and form electrical connections for the cable.

At the termination, the cable insulation is restricted from expanding radially by the injector adapter. Referring to FIG. 7, a cable termination 700 is first comprised of injection adapter 720 that is appreciably cylindrical in shape. An injection adapter 720 is comprised of two ends 722 and 724. End 722 is intended to receive a cable 702. Cable 702, comprised of insulation 704 and conductor 706, is passed partially through injection adapter 720 so that the insulation is partially covered by end 722. Cable connector 708 is inserted into end 724 and makes electrical contact with a conductor 706. Referring now to FIG. 7A, the ends 722 and 724 of injection adapter 720 are compressed onto cable 702 and connector 708. The injection adapter material (typically either 303 Stainless Steel or Aluminum) expands less than Polyethylene and is cooler due to its thermal proximity to the cable interconnects, which can act as a heat sink in the surrounding air. In this situation, the expanding polyethylene is forced inward, reducing the interstitial spaces and restricting the flow path. This effect is expected to intensify as cable heating continues and the mean temperature of the polyethylene increases.

Direct evidence of this effect can be viewed in the cyclic flowrate seen when pressurizing 70° C./100 psi trials and the reduction in outlet flow rate in 70° C./100 psi trials. FIG. 6 shows the cyclic flowrate increases seen when pressurizing. During cooling cycles when the current is turned off, the flowrate is observed to increase and nearly doubles.

Figure 8:
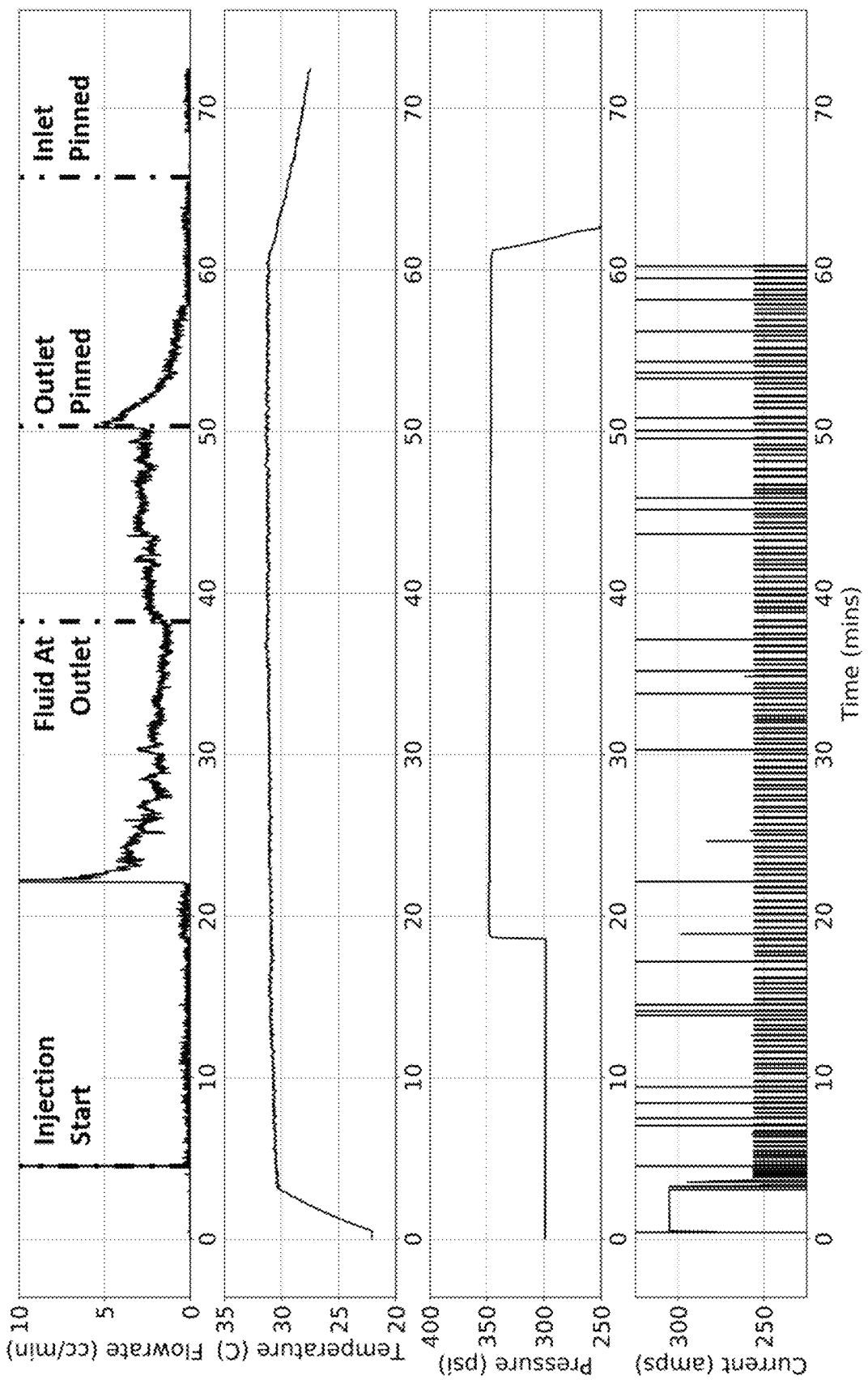
FIG. 8 is sample injection data including cable current, injection pressure, conductor temperature and fluid flow rate where the flow is seen to have a delayed start.
Figure 9:
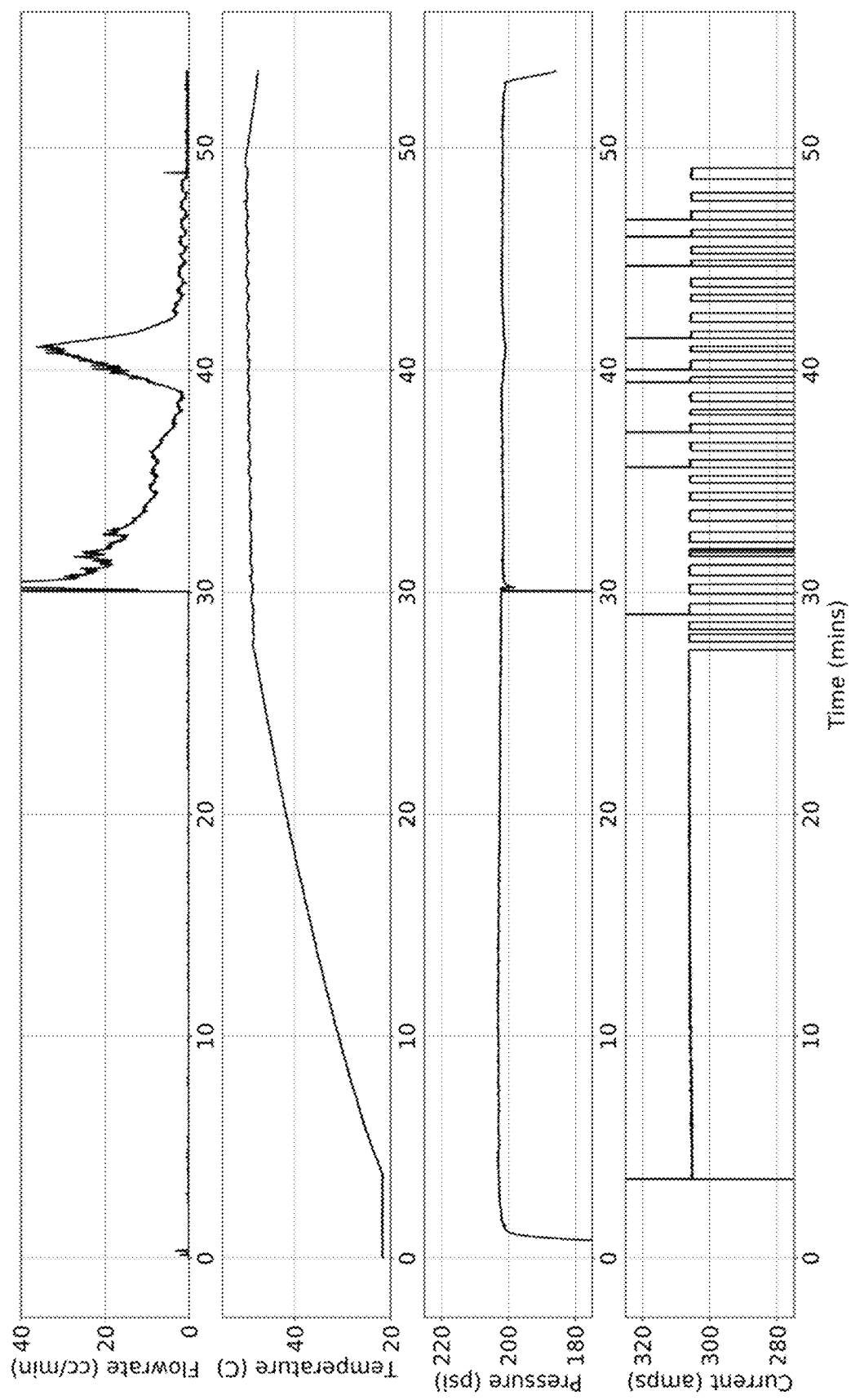
FIG. 9 is sample injection data including cable current, injection pressure, conductor temperature and fluid flow rate where the flow is seen to increase rapidly once fluid breaks through the restriction at the receiving termination.

It was further noted in testing, that some samples demonstrated a delayed start to injection even after pressurized fluid had been connected (FIG. 8). The same samples also tended to demonstrate a rapid increase in flow rate after fluid is observed to reach the receiving end of the cable (FIG. 9). Flow restrictions at the cable ends appear to choke off flow, requiring time for the pressurized fluid to move the thick strand block (PIB) and create a continuous flow path. This phenomenon tends to correspond to cables with dense packing of strand block and less free interstitial volume.

Example 2

A series of tests were run to demonstrate the influence that the injection adapters and the means in which they couple to both cable ends has on injection duration and flow rate.

Figure 10:
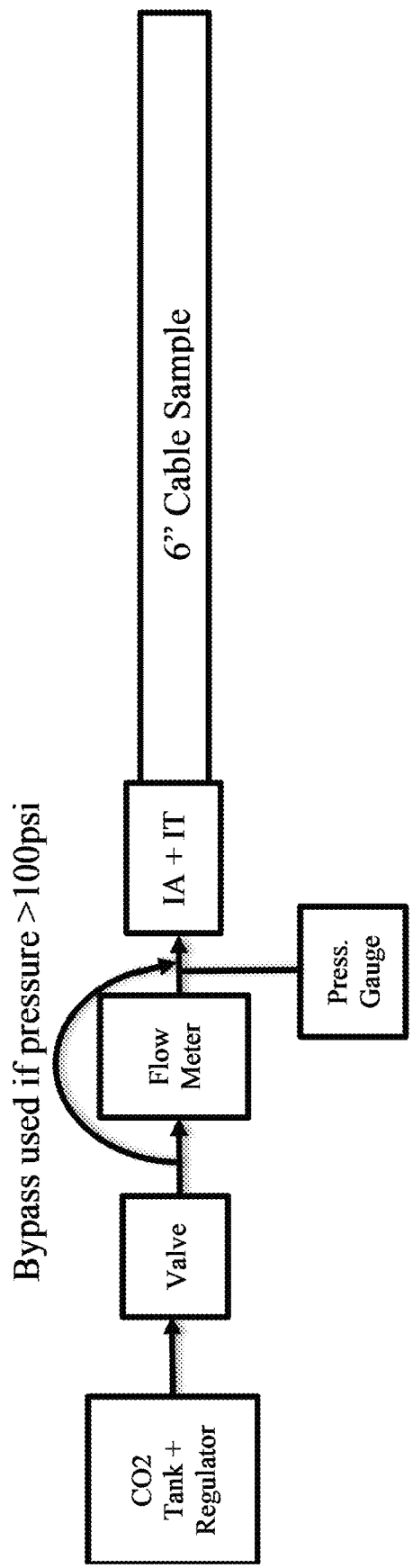
FIG. 10 is a test setup to evaluate the gains in flow rate.

Fifteen cable samples were prepared according to Table 6 and tested in the setup shown in FIG. 10. Samples were prepared using strand-filled and non-strand filled 1/0 AWG 15 kV 175 mil XLPE cable. Prior to installation, the exposed conductor strands were splayed apart and the strand-block material was removed with a wire brush. Prior to folding the wires back, a wire wrap was applied to the inner bundle to slightly birdcage the strands, opening a flow path from the exterior to the interior of the conductor bundle. The connector and injection adapter were then installed following standard electrical craftwork practice.

TABLE 6

Test Matrix for injection adapter sizes A, B and C on strand blocked and non-strand blocked 1/0 cable.

| | Injection Adapter (IA) | | |
|---|---|---|---|
| | Size A | Size B | Size C |
| 1/0 AWG strand block cable | 3 × 6" samples | 3 × 6" samples | 3 × 6" samples |
| 1/0 AWG non-strand blocked | 3 × 6" samples | none | 3 × 6" samples |

For the purpose of this test, injection adapters like those described in U.S. Pat. No. 7,195,504 that use a circumferential swage to seal the injection adapter around the cable end were installed. However, it is appreciated that other injection adapters could be used including but not limited to those disclosed in U.S. Pat. Nos. 7,544,105, 7,344,396, 7,621,767, or 7,658,629 that use gasket style seals on the face of the insulation or adhesives.

Each sample was connected to the test setup and compressed $CO_2$ was injected into the sample at 100 psi. If no flow was observed after 5 minutes, the pressure was increased in 25-psi increments with a 5 minute hold. The results are summarized in Table 7. Looking at the mean flow rates for the strand-blocked cable samples run in triplicate reveals the impact that the injection adapter can have on the overall flow rate of the cable system. The Size C injection adapter which provides the loosest fit on the cable had a mean flow rate that was 3.7 times that of the tightest fitting Size A injection adapter. The intermediate size Size B injection adapter was in the middle. Interestingly, all strand blocked cable samples prepared using the Size A injection adapter required pressure beyond 100 psi to flow. However, once flow was established, the pressure could be reduced to 100 psi and a direct comparison of flow rate could be made.

TABLE 7

Results Summary

| IA | Strand Type | Mean Flow Rate (Standard Liters/Minute) | Standard Deviation | Sample ID | Flow Rate (Standard Liters/Minute) | Pressure at first flow if >100 psi |
|---|---|---|---|---|---|---|
| Size C | Strand Blocked | 1.72 | 0.92 | 1 | 0.69 | |
| | | | | 2 | 1.55 | |
| | | | | 3 | 2.93 | |
| | Non Strand Blocked | 60.6 | 0.00 | 4 | 60.6 | |
| | | | | 5 | 60.6 | |
| | | | | 6 | 60.6 | |
| Size B | Strand Blocked | 1.00 | .16 | 13 | 0.83 | |
| | | | | 14 | 1.21 | |
| | | | | 15 | 0.97 | |
| Size A | Strand Blocked | 0.46 | 0.12 | 7 | 0.62 | 125 |
| | | | | 8 | 0.34 | 275 |
| | | | | 9 | 0.41 | 300 |
| | Non Strand Blocked | 43.1 | 10.86 | 10 | 34.8 | |
| | | | | 11 | 58.4 | |
| | | | | 12 | 35.9 | |

An injection protocol for strand-blocked cable may include the installation of injection adapters that allow for the thermal expansion of the cable insulation. For a temperature increase of about 40° C. over ambient to facilitate an approximate 10-times reduction in viscosity of the PIB-based mastic, that results in about 0.8% radial expansion of the cable's insulation diameter. This is according to the equation D1=DO(dT×alpha+1), where D1 is the final diameter, DO is the starting diameter, dT is the change in temperature in Celsius and alpha is the coefficient of thermal expansion.

Injection Fluid:

Cable injection fluids for treating non-strand filled cable have been well documented in prior art such as U.S. Pat. Nos. 4,766,011, 5,372,841, 7,658,808, and 7,777,131. Some of these teachings have been commercially practiced for over 30 years. However, the prior art fails to anticipate the injection of cables with strand-blocked conductor and the formulations and methods to inject are not suitable for injecting most strand blocked cable. A new injection fluid formulation for strand block cable is herein disclosed.

Conductor Fill %:

In a strand-filled cable, the free volume is the volume between the conductor strands not occupied by the strand fill mastic. The amount of strand block material contained in the conductor can be quantified as the Fill %. The free volume can then be calculated as outlined below.

For various strand block cable makes and vintages, a detailed cable geometry was performed on each cable to calculate interstitial volume. The amount of strand block material per unit length was determined by weighing before and after removal of the strand block with toluene. The difference in mass being the amount of the strand block material per unit length. In this study, a unit length of 12 inches of cable was used. The density of strand block materials based on PIB can be found in literature and was confirmed through testing to generally range between 1.17 and 1.20 g/cm³.

For the purpose of this calculation, a density of 1.20 g/cm³ was assumed and used to calculate the filled volume. The results of the analyses are shown in Table 8.

TABLE 8

Fill % for Various Strand Blocked Cable Samples

| Cable Manufacturer | Cable Vintage | Conductor Size (AWG) | Interstitial Volume (cc/ft.) | Strand Block PIB (g/ft.) | Fill % |
|---|---|---|---|---|---|
| BICC-Brand MT | 2003 | # 2 | 1.0 | 0.418 | 34% |
| BICC-Brand MT | 2008 | 1/0 | 3.2 | 2.283 | 59% |
| Cable MT | Early 2000s | 1/0 | 3.2 | 2.226 | 58% |
| Hendrix | 2019 | 1/0 | 3.2 | 1.557 | 41% |
| Nexins | 2019 | 1/0 | 3.2 | 2.451 | 64% |
| Aconite | 2018 | 1/0 | 3.2 | 0.770 | 24% |
| Pirelli | 1996 | 1/0 | 3.2 | 1.477 | 38% |
| Pirelli | 1996 | 1/0 | 3.2 | 1.671 | 43% |
| Pirelli | 2005 | 1/0 | 3.2 | 2.313 | 60% |
| Prysmian | 2019 | 1/0 | 3.2 | 1.682 | 44% |
| Prysmian | 2019 | 1/0 | 3.2 | 2.250 | 59% |
| Prysmian | 2019 | 1/0 | 3.2 | 1.769 | 46% |
| Prysmian | 2020 | 1/0 | 3.2 | 1.802 | 47% |
| Prysmian | 2020 | 1/0 | 3.2 | 1.780 | 46% |
| SOUTHWIRE | 2014 | 4/0 | 6.8 | 1.279 | 16% |
| SOUTHWIRE | 2004 | 1/0 | 3.2 | 1.801 | 47% |
| SOUTHWIRE | 2017 | 1/0 | 3.2 | 0.731 | 19% |

Fill percentage is found to range from under 20% to over 60%. As not all cable makes and vintages were quantified, the actual range could be appreciably more. Variation is noted between manufacturers, vintages and between spools from the same apparent manufacturing run.

The measurements reveal that on average, about 44% of the conductor's interstitial volume is filled by strand block material. If fluid were to be injected and fill the remaining 56% void space that would leave most medium voltage cables undertreated. As an example, an average non-strand filled 1/0 AWG cable with light compression has an interstitial volume of 3.2 cc/ft. For a non-strand filled cable, the fluid target would be a complete fill of the interstitial volume. However, in a strand block cable, a maximum free volume to receive treatment would typically be at best 56% of 3.2 cc/ft or 1.8 cc/ft and leave the cable under the fluid target. However, as Example 1 illustrates, 56% would be the ceiling. As strand block mastic is not uniformly distributed and the free volume actually a distribution of small voids, a complete fill of the free volume is unlikely.

In the case of cable with PIB-based strand-blocked conductor, an injection fluid in which PIB is at least partially soluble is particularly advantageous. In addition to restoring the dielectric strength of the cable insulation, the right fluid may be capable of forming a solution with the PIB and create a better fill of the conductor's interstitial volume. The solution may also be flowable and PIB may be flushed from the cable to create additional free space for the fluid to better treat the insulation.

The ability of various fluids to form solutions with PIB-based strand block material is demonstrated through the screening test outlined below. While many injection fluids were evaluated, the test is by no means fully exhaustive and it should be appreciated that a similar screening method could be applied to other injection fluid candidates.

The solubility characteristics of carbon black filled PIB strand block mastic were tested in a range of solvents to determine the most efficacious material for strand block injection. The mastic was obtained from Southwire 2019 strand blocked cable by opening the cable and scraping the sticky black material from the conductors. Spheres of the strand block material were placed in glass vials, the test liquid was added, and the vial was shaken at room temperature to qualitatively determine solubility. In most cases, the vials were then placed in a 55° C. oven for varying periods of time. The vials were removed periodically for brief shaking. The results can be seen in Table 9.

TABLE 9

Results from Solubility Testing of Rejuvenation Fluids & Solvents.

| Sample ID | Composition | Temperature ° C. | Time hours | Result |
|---|---|---|---|---|
| DCB3-50A | PIB only | 40-100 | 3 | Slight softening above 50° C. |
| DCB3-50B1 | PIB:732/30 1:1 | 55 | 144 | No apparent dissolution |
| DCB3-50B2 | PIB:732/30 1:2 | 55 | 144 | No apparent dissolution |
| DCB3-50B2 | PIB:732/30 1:4 | 55 | 144 | No apparent dissolution |
| DCB3-50C | PIB:Xylene 1:2 | 25-55 | 6 | Started dissolving at room temperature, completely dissolved at 55° C. leaving a carbon black suspension |
| DCB3-50D | PIB:TEM 1:5 | 55 | 168 | No apparent dissolution at room temp so aged at 55° C. Small particles were formed after 1 hour. After 168 hours with some shaking, all mastic reduced to small particles but not as fluffy as particles formed in xylene. |
| DCB3-50E | PIB:PhMDM 1:5.3 | 55 | 72 | Even with vigorous shaking, little of the mastic dissolved. |
| DCB3-50F | PIB:TEM 1:2.5 | 55 | 30 | After 8 hours with occasional shaking about 1/3 of mastic had dissolved, and after 30 hours, all the mastic had dissolved. |
| DCB3-50G | PIB:DMDB 1:5.3 | 55 | 1 | After 5 min of shaking at room temperature, half the mastic had dissolved, but further shaking did not dissolve the rest. 30 min at 55° C. with occasional shaking dissolved the rest of the mastic. |
| DCB3-50H | PIB:DMDB 1:3.3 | 55 | 12 | Most of the mastic dissolved after 2 hours with complete dissolution overnight. The suspension was filtered to isolate a yellow solution. |
| DCB3-50I | PIB:DMDB 1:3.3 | 55 | 12 | Dicumyl peroxide (6.6 wt % based on mastic) was dissolved in DMDB, then the mastic was added and the sample aged at 55° C. All of the mastic dissolved overnight. The suspension was filtered to isolate a yellow solution. |
| DCB3-50P | PIB:TEMDB 1:3.2 | 55 | 47 | Not all of the mastic was dissolved after 47 hours at 55° C. |
| DCB3-50S | PIB:TEMDB 1:3.2 | 55 | 47 | After 47 hours with periodic shaking, all the mastic was dissolved. The suspension was filtered through filter paper to isolate a yellow liquid. |
| DCB3-50AC | PIB:DMDM 1:3.3 | 55 | 48 | Shaking at room temp produced a little dissolution, but even 48 hours at 55° C. just broke the large pieces into smaller granules. The fluffy carbon black seen with DMDB was not evident. |
| DCB3-50AD | PIB:DMDE | 55 | 48 | Shaking at room temp produced a moderate amount of dissolution, but even 48 hours at 55° C. just broke the large pieces into smaller granules. The fluffy carbon black seen with DMDB was not evident. DMDE was better than DMDM |
| DCB3-50AF | PIB:i-Pr2 1:3.3 | 25 | 1.3 | Most of the mastic dissolved with occasional shaking at room temperature. It did not appear to be as effective as DMDB |
| DCB3-50AG | PIB:Bu2 1:3.3 | 25 | 2 | Partially dissolved at room temperature with shaking. It was not as effective as DMDB. |

The PIB material was first tested without a solvent at elevated temperature to assess its "melting" behavior. A sphere of PIB was placed in a glass vial, and the vial was placed in an oven. The temperature was increased from 40° C. to 10000 over a period of 3 hours. There appeared to be a slight softening above 50° C., but the material did not flow even at 100° C.

When spheres of the PIB were mixed in a 1:2 weight ratio with xylenes and agitated at room temperature, the PIB began dissolving immediately. The liquid portion became black colored, and fine, carbon black particles were evident. Most of the PIB dissolved at room temperature, and the remainder dissolved within 6 hours at 55° C. This produced a yellow solution with very fine black powder suspended in it.

PIB was then tested with Novinium CableCure® 732/30 rejuvenation fluid at 1:1, 1:2, and 1:4 weight ratios at 55° C. with occasional agitation over a period of 144 hours. Cablecure 732/30 is a fluid mixture primarily consisting of tolylethylmethyldimethoxysilane (TEM) and Cyanobutylmethyldimethoxysilane (CBM). No dissolution of the PIB was observed in any of the samples.

PIB with tolylethylmethyldimethoxysilane (TEM) in a 1:5 ratio did not appreciably dissolve at room temperature, so it was aged at 55° C. After about 1 hour with occasional shaking, the large spheres of PIB began to break into smaller particles, and eventually all the large spheres were reduced to small particles, but the fluffy carbon black particles resulting in the case of xylene were not seen. The experiment was repeated with a PIB:TEM ratio of 1:2.5 with the same result.

PIB with phenylmethyldimethoxysilane (PhMDM) in a 1:5.3 weight ratio did not dissolve at 55° C. even after 72 hours.

PIB in dimethyldimethoxysilane (DMDM) at a 1:3.3 ratio produced no dissolution at room temperature, and after 48 hours at 55° C., the spheres of PIB were reduced to small granules with no free carbon black. A similar experiment using dimethyldiethoxysilane (DMDE) gave the same result, but the granules formed were finer than in the case of dimethyldimethoxysilane.

In contrast, when PIB was mixed at room temperature in a 1:5.3 ratio with dimethyldi-n-butoxysilane (DMDB), about half the PIB dissolved in 5 minutes. The rest dissolved in a 55° C. oven in less than 30 minutes with occasional shaking. The particles formed were small and fluffy like those seen with xylenes.

Two mixes of PIB with DMDB at a ratio of 1:3.3 were then prepared. Dicumyl peroxide (Di-Cup) was added to one of the samples at 6.6 wt % of the PIB, and the samples were aged for 12 hours at 55° C. with occasional shaking. Both samples dissolved completely during that time to give suspensions of carbon black in liquid. The samples were filtered through filter paper to remove the carbon black giving homogeneous yellow liquids, and their viscosity was determined at room temperature. The solution without dicumyl peroxide had a viscosity of 9.23 cSt while the solution with dicumyl peroxide had a viscosity of 8.43 cSt. For comparison, pure DMDB has a room temperature viscosity of 1.19 cSt, so the dissolved PIB produced a significant increase in viscosity for both samples. The reduction in viscosity for the sample with dicumyl peroxide compared to the one without indicates that dicumyl peroxide reduces the molecular weight of the PIB.

A mixture of PIB and tolylethylmethyldi-n-butoxysilane (TEMDB) in a 1:3.2 weight ratio was heated in a 55° C. oven with occasional agitation. After 47 hours, the PIB was completely dissolved, and the mixture was filtered to remove the carbon black. The resulting yellow liquid was found to have a viscosity at room temperature of 43 cSt while the pure TEMDB has a viscosity of 4.74 cSt. This indicates that although TEMDB is fairly effective at dissolving the PIB, it does not thin it to nearly the extent DMDB does.

Two other materials with structures similar to DMDB were also tested at a weight ratio of 3.3. Di-i-propyldimethoxysilane dissolved most of the PIB at room temperature, but visually, it did not appear to be as effective as DMDB. Di-n-butyldimethoxysilane, which has a molecular weight identical to DMDB dissolved part of the PIB at room temperature, but it was clearly not as effective as DMDB.

Of the fluids evaluated, dimethyldi-n-butoxysilane (DMDB), tolylethylmethyldi-n-butoxysilane (TEMDB), Di-i-propyldimethoxysilane (DPrDM), and di-n-butyldimethoxysilane (DBDM), were found to be effective solvents for PIB, making them good candidates for an injection fluid tailored to strand block materials. PIB was moderately soluble in other fluids including tolylethylmethyldimethoxysilane (TEM) and dimethyldimethoxysilane, and insoluble or only slightly soluble in fluids like Cyanobutylmethyldimethoxysilane and phenylmethyldimethoxysilane. It should be appreciated that this list is purely demonstrative and other fluids not tested may exhibit similar behavior.

Peroxide additives like dicumyl peroxide (Di-Cup) may make a suitable additive as it appears to lower the viscosity of the fluid/PIB mixture [Oxley, 1969]. While only Di-Cup was tested because of its use as a cross linker during the cable manufacturing process and has known ability to cause chain scission of butyl rubbers and PIB, it should be appreciated that other organic peroxides or aryl peroxides could also be included as an additive.

Flushing of PIB to Increase Treatment Volume

A test was performed to demonstrate the ability of inject fluid solvent to flush the strand block material from the cable and create additional interstitial volume in which to treat the insulation.

For the purpose of the test, DMDB was selected as a fluid in which PIB is highly soluble. It was mixed with <1.0 wt % hydrolysis condensation catalyst DDBSA (dodecylbenzene sulfonic acid).

Using a test apparatus like that shown in FIG. 4, all injections were performed at 250 psi and 50° C. A 10-foot dummy cable instrumented with a thermocouple in a hole drilled to the conductor was used to control temperature. The thermally enhanced rejuvenation (TER) system was set to a current of 250 Amps. Ambient temperature was 16.5° C. near the floor. Both ends of the cable were closed as soon as enough sample was collected. There was at least an hour between the start of heating and injection start for the 50 feet and 100 feet samples to be sure the test cable had stabilized at temperature.

TABLE 10

Results

| Parameter | 20 foot Sample | 50 foot Sample | 100 foot Sample |
| --- | --- | --- | --- |
| Injection Duration (min:ss) | 2:10 | 8:34 | 114:56 |
| Bottle 1 Fill Duration (s) | 25 | 204 | 514 |
| Bottle 2 Fill Duration (s) | — | 130 | 505 |
| Bottle 1 Amount Collected (g) | 15.82 | 19.86 | 18.25 |

TABLE 10-continued

Results

| Parameter | 20 foot Sample | 50 foot Sample | 100 foot Sample |
|---|---|---|---|
| Bottle 2 Amount Collected (g) | 12.47 | 19.32 | 24.07 |
| Fluid injected by tank gauge (cc) | 66.64 | 99.96 | 199.92 |
| Weight Before (g) | 4575 | 11195 | 22090 |
| Weight After (g) | 4597 | 11249 | 22221 |
| Weight Gain (g) | 22 | 54 | 131 |

The flush samples were analyzed by FTIR to determine their PIB concentration using a known calibration curve. The results for the 3 cables are shown in Table 11. Weight percent of PIB in the first flush sample is observed to increase fairly linearly with length of cable and confirms that a soluble fluid like DMDB is an effective means to remove PIB from the conductor and create interstitial volume. Looking specifically at the 100-foot sample, it is interesting to note that for approximately 10cc of fluid flushed from the conductor, 4cc of additional conductor volume was being created in the conductor to hold more rejuvenation fluid for the insulation's treatment. Consequently, 10% additional interstitial volume could be created by flushing approximately 25% of injected volume through the cable and collecting it in the catch tank. Or further, 20% additional interstitial volume could be created by flushing approximately 50% of the injected volume through the cable and collecting it in the catch tank.

Viscosity was also noted to increase and follows a more exponential fit. The increase in viscosity also corresponds to the injection duration documented in Table 9, which ranged from just over 2 minutes for the 20-foot sample to over 114 minutes for the 100-foot sample. Treatment levels were also seen to increase with injection duration. The near 20% increase in treatment fluid for the 100-foot sample corresponds to an injection time of almost 115 minutes compared to the 20 and 50-foot samples that took less than 10 minutes to inject. This demonstrates the value in a post injection soak period discussed earlier.

TABLE 11

PIB weight percent and viscosity for flush samples

Flush Collected in Bottle #1

| Sample | Weight % PIB | Estimated Viscosity (cSt) | Treatment (g/ft) |
|---|---|---|---|
| 20 ft | 10.6 | 4.7 | 1.1 |
| 50 ft | 22.9 | 33.3 | 1.1 |
| 100 ft | 43.5 | 894.1 | 1.3 |

As highlighted in the above results, viscosity of the fluid before and after injection into a strand-blocked cable is an important consideration. For reference, the viscosity of several common pure injection fluids is provided in Table 11. The following test was performed to better quantify the effect PIB weight percent has on viscosity.

TABLE 12

Viscosities for Common Injection Fluids

| Injection Fluid | Viscosity (cSt) |
|---|---|
| Dimethyldimethoxysilane | 0.44 |
| Dimethyldibutoxysilane | 1.19 |

TABLE 12-continued

Viscosities for Common Injection Fluids

| Injection Fluid | Viscosity (cSt) |
|---|---|
| Phenylmethyldimethoxysilane | 1.71 |
| Cyanobutylmethyldimethoxysilane | 2.81 |
| Tolylethylmethyldimethoxysilane | 2.92 |
| Tolylethylmethyldi-n-butoxysilane | 4.74 |

Viscosity Considerations:

PIB was isolated from the mastic as described in this example. 16.3579 g of mastic (DCB3-63F harvested from feeder cable) and 65.7 g of toluene were placed in a 250 mL bottle, and the contents were shaken for a while during which time most of the mastic dissolved. The bottle was placed in a 55° C. oven overnight. The rest of the mastic dissolved during that time. The bottle was cooled to room temperature, and the suspension of black solid in yellow liquid filtered through a medium frit to isolate a black solid (DCB3-63AA; 7.9444 g; 48.6 wt % of the mastic.) from the dark filtrate (DCB3-63AB). The black solid was washed with 15 mL more toluene, and the filtrate was combined with 63AB. The black solid was further washed with 15 mL toluene and 15 mL acetone. This filtrate was discarded. Air was pulled through the frit for 1 hour, and then the frit was placed in a 55° C. oven to dry. The weight of the frit+carbon black was 74.5859 g.

63AB was placed in a 250 mL round bottom flask. The flask was then stripped on a rotovap at 170 mm Hg at a bath temperature of 60° C. to distill over a little more than half the toluene. The dark solution was then transferred to a 100 mL round bottom flask. Toluene was removed at an 80° C. bath temperature and 105 mm Hg leaving a dark, viscous oil. It was stripped at an 80° C. bath temperature and best system vacuum for 2 hours three different times to remove as much of the toluene as possible. A brown, non-flowing, very sticky solid remained after the toluene was removed.

2.3071 g of PIB and 6.9214 g of DMDB were added to a 15 mL glass vial, which was shaken briefly and then placed in a 55° C. oven overnight. All of the material dissolved to give a somewhat viscous yellow solution of 25.00% PIB in DMDB. 6.8009 g of 25% solution and 1.6997 g DMDB were mixed in a 15 mL glass vial to give a slightly viscous yellow solution of 20.00% PIB in DMDB. 6.5047 g of 20% solution and 2.1697 g of DMDB were combined in a 15 mL glass vial to give a yellow solution of 15.00% PIB in DMDB. 5.5085 g of 15% solution and 2.7529 g of DMDB were combined in a 15 mL glass vial to give a yellow solution of 10.00% PIB in DMDB.

Figure 11:
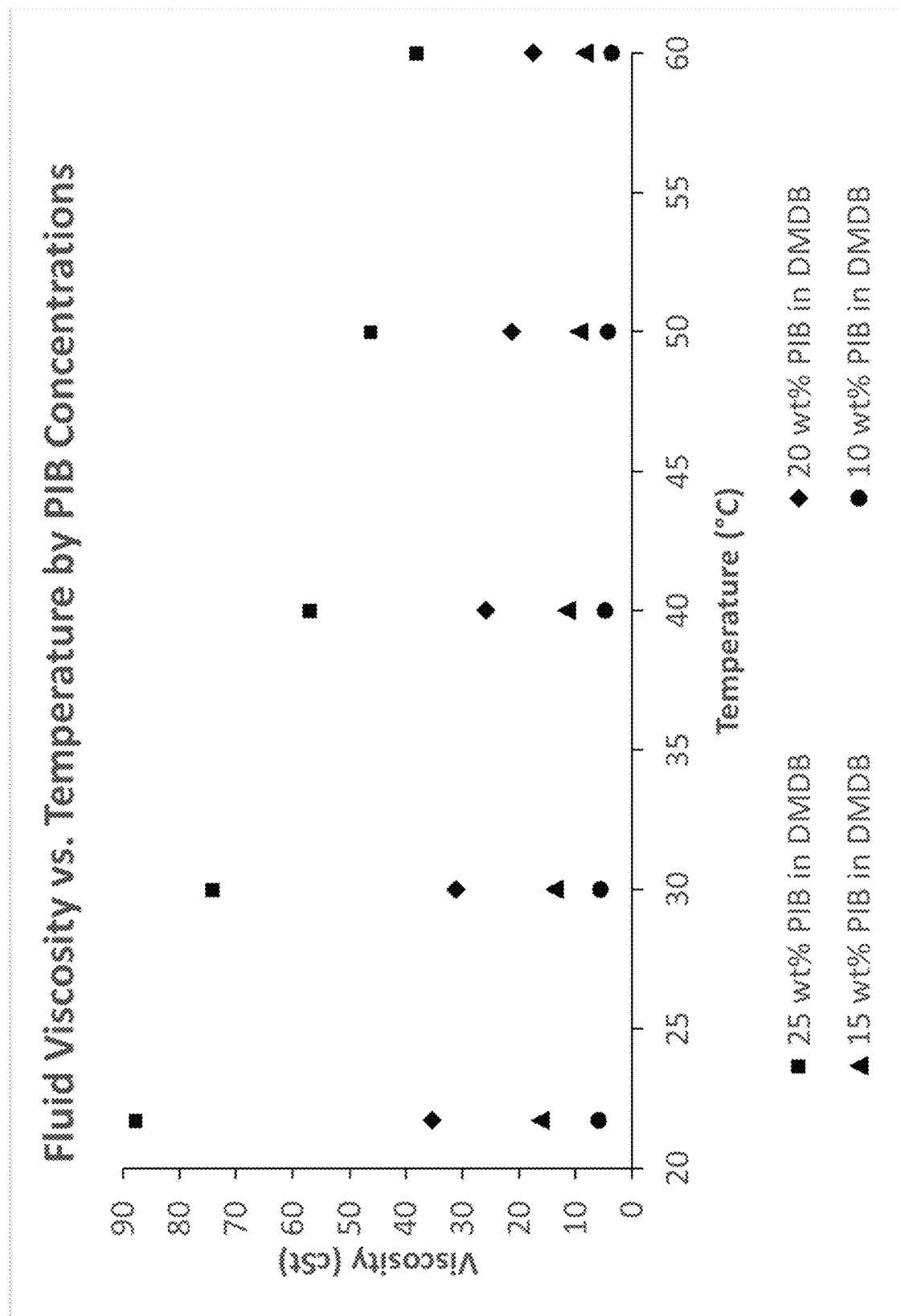
FIG. 11 is a viscosity vs. temperature graph for various PIB concentrations in DMDB.
Figure 12:
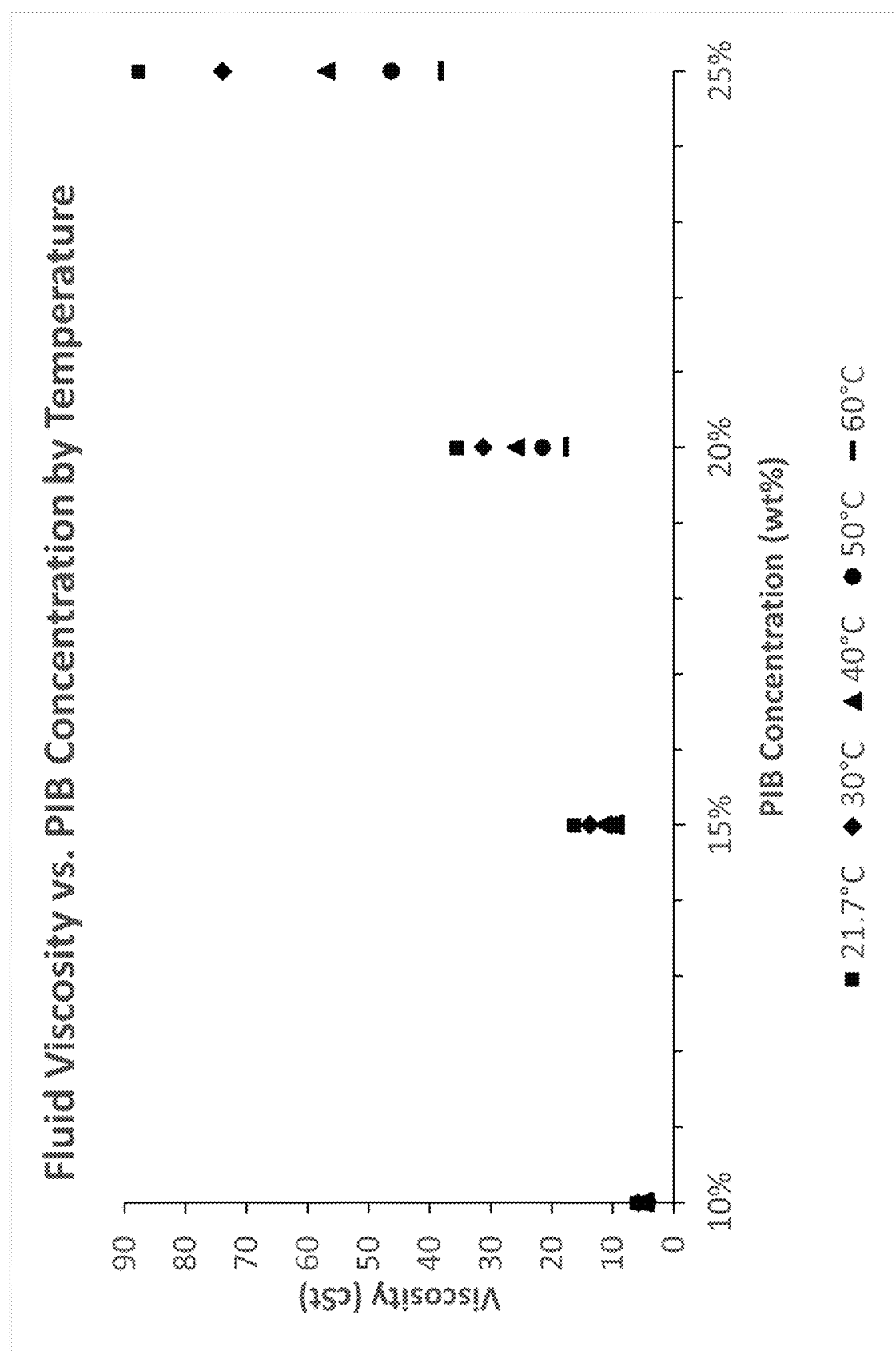
FIG. 12 is a viscosity vs. PIB concentrations graph in DMDB at various temperatures.

The viscosity of each of the four (4) solutions was measured at room temperature, 30, 40, 50, and 60° C. The results are shown in Table 13 below. The results are further illustrated in a graph of viscosity vs. temperature for the 4 concentrations (FIG. 11) and viscosity vs. concentration at 5 temperatures (FIG. 12).

TABLE 13

Viscosity of DMDB at 4 PIB concentration levels

| Solution | Temperature (° C.) | Efflux (sec) | Viscosity (cSt) |
|---|---|---|---|
| 10% PIB in DMDB | 21.7 | 385 | 5.96 |
| | 30 | 360 | 5.57 |
| | 40 | 308 | 4.76 |

TABLE 13-continued

Viscosity of DMDB at 4 PIB concentration levels

| Solution | Temperature (°C.) | Efflux (sec) | Viscosity (cSt) |
|---|---|---|---|
|  | 50 | 275 | 4.25 |
|  | 60 | 233 | 3.60 |
| 15% PIB in DMDB | 21.7 | 489 | 16.24 |
|  | 30 | 415 | 13.78 |
|  | 40 | 348 | 11.54 |
|  | 50 | 283 | 9.38 |
|  | 60 | 253 | 8.38 |
| 20% PIB in DMDB | 21.7 | 367 | 35.35 |
|  | 30 | 324 | 31.19 |
|  | 40 | 269 | 25.88 |
|  | 50 | 223 | 21.44 |
|  | 60 | 183 | 17.58 |
| 25% PIB in DMDB | 21.7 | 910 | 87.65 |
|  | 30 | 768 | 73.93 |
|  | 40 | 592 | 56.95 |
|  | 50 | 480 | 46.14 |
|  | 60 | 396 | 38.04 |

The results demonstrate that injection fluids that can produce a high weight percent solution of PIB may result in a viscosity that slows cable injection.

For DMDB as solvent, even 50 wt % PIB is eventually soluble, and it is likely that given enough time to diffuse, the PIB is probably miscible in DMDB. Visual evaluation of mixtures of DMDB with 25 wt %, 35 wt %, and 50 wt % PIB indicates that the viscosity curve turns up sharply above 25 wt % PIB, so a fluid for strand-blocked cable injection that dissolves more than 25 wt % PIB is likely to be too viscous for acceptable flow. To maintain a workable viscosity for cable injection, a maximum solubility of about 20 wt % PIB is preferred. Further, a maximum solubility of about 15 wt % PIB may be preferred to maintain a workable viscosity for cable injection. Various injection fluids intended to limit the solubility of PIB to 15 wt % are described below.

Three samples were prepared using the PIB isolated from the strand block mastic. Each of the samples consisted of 25 wt % PIB and 75 wt % solvent. For Sample 65A, the solvent was 50 wt % 732/30 and 50 wt % DMDB; for Sample 65B, the solvent was 25 wt % 732/30 and 75 wt % DMDB; and for Sample 65C, the solvent was 50 wt % 732/50 and 50 wt % DMDB. The samples were placed in a 55° C. oven and removed and shaken periodically. After standing in the oven overnight, further shaking dispersed the remaining PIB in Samples 65A and 65C. There was no solid PIB evident in Sample 65B which was a homogeneous solution. The other two samples contained two phases, a yellow-brown, less viscous phase, and a more viscous white phase. Shaking of Samples 65A and 65C produced a suspension of the two phases. This indicates that, while PIB is miscible with DMDB, the addition of other solvents can drastically modify the solubility of PIB.

Table 14 below contains the details of 23 experiments. Previous work has shown that PIB has at most slight solubility in 732/30, 732/50, 732/80. The first three experiments in the table, Samples 65A-C, were discussed above. PIB appears to have virtually no solubility in CBM or PhMDM (phenylmethyldimethoxysilane).

Some solubility of PIB in TEM is indicated, so three experiments were conducted with 5, 10, and 15 wt % PIB in TEM. Even the 5% PIB was not completely soluble in TEM at 55° C.

PhMDM by itself dissolves very little PIB, so mixtures of PhMDM with DMDB at 2:1, 3:2, and 1:1 were made. At 2:1 PhMDM:DMDB with 15% or 10% PIB, the majority of the material dissolved, and the rest could be dispersed as small particles with shaking. At 3:2 and 1:1 PhMDM:DMDB, homogeneous solutions were achieved at 55° C., but when the solutions cooled, a second phase formed.

PIB solubility in a range of mixtures of DMDB and CBM was determined. With either 15 wt % or 10 wt % PIB, incomplete solubility was observed at DMDB to CBM ratios of 75:25, 80:20, 81.8:18.2, and 82.5:17.5. In all these cases, the majority of the PIB dissolved, and the remaining PIB could be dispersed into very small particles by shaking.

When a ratio of 84:16 DMDB:CBM was used, PIB concentrations of 13.8, 15.0, 20.0, and 25.0 wt % gave homogeneous solutions at 55° C. Interestingly, the 25 wt % solution remained homogeneous after cooling to room temperature, but the lower concentrations of PIB formed two layers on cooling.

TABLE 14

Solubility of PIB in Various Solvents and Solvent Mixtures at 55° C.

| Sample ID | % PIB | Solvent Mix | | Results |
|---|---|---|---|---|
| | | Solvents | Ratio | |
| DCB3-65A | 25 | DMDB:732/30 | 50:50 | Separated into a thin brown upper layer and thick white/clear lower layer. |
| DCB3-65B | 25 | DMDB:732/30 | 75:25 | Homogeneous brown liquid at 55° C. and r.t. |
| DCB3-65C | 25 | DMDB:732/50 | 50:50 | Separated into a thin brown upper layer and thick white/clear lower layer. |
| DCB3-65E | 15 | TEM | | Some PIB dissolved. The rest dispersed on shaking |
| DCB3-65I | 10 | TEM | | About half of the material dissolved, and the rest dispersed as small particles with shaking. |
| DCB3-65K | 5 | TEM | | At least 3/4ths of the material dissolved, and the rest dispersed as small particles with shaking. |
| DCB3-65D | 15 | PhMDM | | After 24 hours, the PIB had softened, but little appeared to be dissolved. |
| DCB3-65J | 15 | DMDB:PhMDM | 33:67 | Much of the material dissolved, and the rest dispersed as very small particles with shaking. |
| DCB3-65M | 10 | DMDB:PhMDM | 33:67 | Most of the material dissolved, and the rest dispersed into very small particles with shaking. |
| DCB3-65P | 15 | DMDB:PhMDM | 40:60 | A homogeneous solution was achieved. |
| DCB3-65H | 15 | DMDB:PhMDM | 50:50 | Homogeneous solution achieved. On cooling to room temperature, a second phase formed. |

TABLE 14-continued

Solubility of PIB in Various Solvents and Solvent Mixtures at 55° C.

| Sample ID | % PIB | Solvent Mix Solvents | Ratio | Results |
|---|---|---|---|---|
| DCB3-65F | 15 | CBM | | Little PIB dissolved |
| DCB3-65G | 15 | DMDB:CBM | 75:25 | Some of the material dissolved, and the rest dispersed into small pieces with shaking. |
| DCB3-65O | 10 | DMDB:CBM | 75:25 | Most of the material dissolved, and the rest dispersed into very small particles with shaking. |
| DCB3-65N | 15 | DMDB:CBM | 80:20 | Most of the material dissolved, and the rest dispersed into very small particles with shaking. |
| DCB3-65Q | 10 | DMDB:CBM | 80:20 | Most of the material dissolved, and the rest dispersed into very small particles with shaking. |
| DCB3-65R | 15 | DMDB:CBM | 81.8:18.2 | Most of the material dissolved, and the rest dispersed into very small particles with shaking. |
| DCB3-65S | 10 | DMDB:CBM | 81.8:18.2 | Most of the material dissolved, and the rest dispersed into very small particles with shaking. |
| DCB3-65T-1 | 14.89 | DMDB:CBM | 82.5:17.5 | Most of the material dissolved, and the rest dispersed into very small particles with shaking. |
| DCB3-65U-1 | 9.98 | DMDB:CBM | 82.7:17.3 | Most of the material dissolved, and the rest dispersed into very small particles with shaking. |
| DCB3-65L | 15 | DMDB:CBM | 83.3:16.7 | Homogeneous solution. A significant amount of material precipitated at room temperature. |
| DCB3-65U-2 | 9.45 | DMDB:CBM | 83.7:16.3 | Almost homogeneous with haze of very small, dispersed particles |
| DCB3-65Z | 25.0 | DMDB:CBM | 84.0:16.0 | Homogeneous solution formed at 55° C. |
| DCB3-65AA | 20.0 | DMDB:CBM | 84.0:16.0 | Homogeneous solution formed at 55° C. |
| DCB3-65AB | 15.0 | DMDB:CBM | 84.0:16.0 | Homogeneous solution formed at 55° C. |
| DCB3-65T-2 | 13.8 | DMDB:CBM | 84.0:16.0 | Homogeneous solution formed at 55° C. |

In another set of experiments, fluid mixtures of TEM and DMDB were made in which the concentration of DMDB in the overall fluid mixture included 25, 20, 15, 10, and 5 wt %. Each of these fluid mixtures was combined with sufficient PIB to prepare a mixture with an overall PIB concentration of 15 wt %. These mixtures were shaken and heated in a 55° C. oven for 24 hours. For the fluid mixtures with 25, 20, and 15 wt % DMDB, complete dissolution of the PIB at 55° C. occurred. For the fluid mixtures with 10 and 5 wt % DMDB, most, but not all of the PIB dissolved under the same conditions. These results indicate that mixtures of TEM with DMDB containing less than 15 wt % DMDB limit the solubility of PIB to 15 wt %. Preferably, the fluid mixture should contain no more than 10 wt % DMDB.

In one embodiment, the fluid formulation is primarily a mix of a silane in which PIB is soluble and a hydrolysis condensation catalyst. In a preferred embodiment, the fluid is selected from formulations consisting of about <1.0 wt % DDBSA and >90.0 wt % dimethyldi-n-butoxysilane (DMDB), tolylethylmethyldi-n-butoxysilane (TEMDB), Di-i-propyldimethoxysilane (DPrDM), Di-n-butyldimethoxysilane (DBDM), and tolylethylmethyldimethoxysilane (TEM). However, it should be appreciated that other silanes that exhibit similar solubility results with PIB could be substituted.

In a second embodiment, the fluid formulation is a mix of a silane in which PIB is soluble, a silane in which PIB is sparingly soluble or insoluble and a hydrolysis condensation catalyst. In one preferred embodiment, the fluid formulation consists of about <1.0 wt % DDBSA, >10 wt % dimethyldi-n-butoxysilane (DMDB), tolylethylmethyldi-n-butoxysilane (TEMDB), Di-i-propyldimethoxysilane (DPrDM), Di-n-butyldimethoxysilane (DBDM) or dimethyldimethoxysilane (DMDM) and >40 wt % Cyanobutylmethyldimethoxysilane (CBM), phenylmethyldimethoxysilane (PhMDM), or tolylethylmethyldimethoxysilane (TEM). However, it should be appreciated that other silanes that exhibit similar solubility results with PIB could be substituted. In another preferred embodiment including a silane in which PIB is soluble, a silane in which PIB is sparingly soluble or insoluble and a hydrolysis condensation catalyst, the relative amounts of silanes in which PIB is soluble and the amounts of silanes in which PIB is sparingly soluble or insoluble are tailored to limit the solubility of PIB in the silane mixture to no more than 15 wt % at 55° C. For example, a fluid consisting of <1 wt % DDBSA with a silane mixture consisting of 1 part DMDB to 9 parts TEM provides such a fluid that limits the solubility of PIB to <15 wt % at 55° C.

In yet another embodiment, the fluid formulation is a mix of a silane in which PIB is soluble, an organic peroxide and a hydrolysis condensation catalyst. In one preferred embodiment, the fluid formulation consists of about <1.0 wt % DDBSA, <10 wt % dicumyl peroxide or other organic or aryl peroxides and >25 wt % dimethyldi-n-butoxysilane (DMDB), tolylethylmethyldi-n-butoxysilane (TEMDB), Di-i-propyldimethoxysilane (DPrDM), Di-n-butyldimethoxysilane (DBDM), or tolylethylmethyldimethoxysilane (TEM). However, it should be appreciated that other silanes that exhibit similar solubility results with PIB could be substituted.

Example 3

A series of tests were conducted to demonstrate the effect that injection fluid, the method in which the injection adapter is affixed to the insulation and the selection of temperature and pressure have on injection duration and fluid volume injected.

In this study, two fluid formulations were evaluated. The first is a fluid blend of primarily TEM, CBM and hydrolysis condensation catalyst (DDBSA) known commercially as 732-50. The second formulation is DMDB with hydrolysis condensation catalyst DDBSA.

Using a test apparatus like that shown in FIG. 4, seventeen samples were prepared according to Table 15. All samples measured 20 feet and were constructed from strand block cable of various makes and vintages.

TABLE 15

Test Matrix for Example 3.

| Trial | Cable | Cable Manufacturer | Cable Vintage | Fill % | Pressure (psi) | Temperature (° C.) | Fluid | IA Size |
|---|---|---|---|---|---|---|---|---|
| 1 | A | Prysmian | 2020 | 46% | 350 | 30 | 732-50 | B |
| 2 | A | Prysmian | 2020 | 46% | 100 | 70 | 732-50 | C |
| 3 | A | Prysmian | 2020 | 46% | 350 | 30 | 732-50 | C |
| 4 | A | Prysmian | 2020 | 46% | 100 | 70 | 732-50 | B |
| 5 | A | Prysmian | 2020 | 46% | 350 | 30 | DMDB | B |
| 6 | A | Prysmian | 2020 | 46% | 100 | 70 | DMDB | B |
| 7 | A | Prysmian | 2020 | 46% | 350 | 30 | DMDB | C |
| 8 | A | Prysmian | 2020 | 46% | 100 | 70 | DMDB | C |
| 9 | A | Prysmian | 2020 | 46% | 200 | 50 | DMDB | C |
| 10 | B | Prysmian | 2019 | 47% | 200 | 50 | DMDB | C |
| 11 | B | Prysmian | 2019 | 47% | 350 | 30 | DMDB | B |
| 12 | C | BICC | 2008 | 59% | 200 | 50 | DMDB | D |
| 13 | C | BICC | 2008 | 59% | 350 | 30 | DMDB | E |
| 14 | D | Southwire | 2004 | 47% | 200 | 50 | DMDB | D |
| 15 | D | Southwire | 2004 | 47% | 350 | 30 | DMDB | C |
| 16 | E | Nexans | 2019 | 64% | 350 | 30 | DMDB | C |
| 17 | E | Nexans | 2019 | 64% | 100 | 70 | DMDB | C |

The results for each trial are shown in Table 16.

TABLE 16

Test results for Example 3.

| Trial | Cable | Conductor Temp. (° C.) | Injection Pressure (psi) | Fluid | IA | Injection Duration (Min) | Fluid Volume (cc/ft) | Injection Duration for 300 feet (hours) |
|---|---|---|---|---|---|---|---|---|
| 1 | A | 30 | 350 | 732-50 | 4-2 | 4.3 | 1.4 | 1.1 |
| 2 | A | 70 | 100 | 732-50 | 4-2 | 2.5 | 1.6 | 0.6 |
| 3 | A | 30 | 350 | 732-50 | 3-2 | 4.0 | 1.0 | 1.0 |
| 4 | A | 70 | 100 | 732-50 | 3-2 | 3.0 | 1.2 | 0.8 |
| 5 | A | 30 | 350 | DMDB | 4-2 | 2.8 | 1.1 | 0.7 |
| 6 | A | 70 | 100 | DMDB | 4-2 | 2.3 | 1.9 | 0.6 |
| 7 | A | 30 | 350 | DMDB | 3-2 | 2.2 | 1.4 | 0.5 |
| 8 | A | 70 | 100 | DMDB | 3-2 | 2.7 | 1.5 | 0.7 |
| 9 | A | 50 | 200 | DMDB | 4-2 | 1.0 | 1.3 | 0.3 |
| 10 | B | 50 | 200 | DMDB | 4-2 | 4.5 | 1.6 | 1.1 |
| 11 | B | 30 | 350 | DMDB | 3-2 | 7.5 | 1.6 | 1.9 |
| 12 | C | 50 | 200 | DMDB | 5-2 | 7.8 | 1.8 | 2.0 |
| 13 | C | 30 | 350 | DMDB | 6-2 | 15.0 | 1.4 | 3.8 |
| 14 | D | 50 | 200 | DMDB | 5-2 | 13.8 | 1.3 | 3.5 |
| 15 | D | 30 | 350 | DMDB | 4-2 | 31.3 | 1.5 | 7.8 |
| 16 | E | 30 | 350 | DMDB | 4-2 | 22.8 | 0.7 | 5.7 |
| 17 | E | 70 | 100 | DMDB | 4-2 | — | 1.5 | — |

Figure 13:
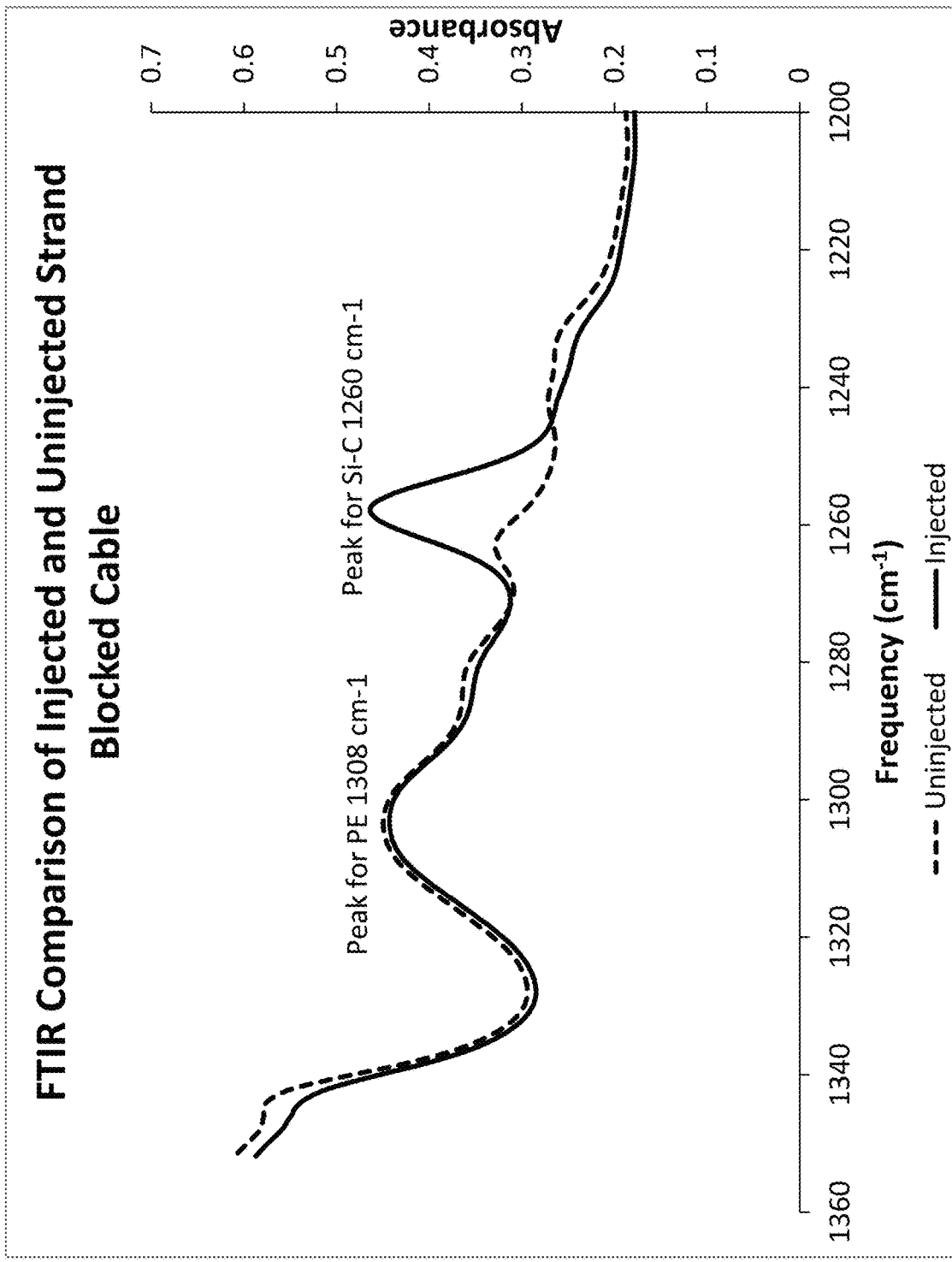
FIG. 13 illustrates an example of Fourier Transform Infrared spectroscopy (FTIR) of a treated cable's insulation.
Figure 14:
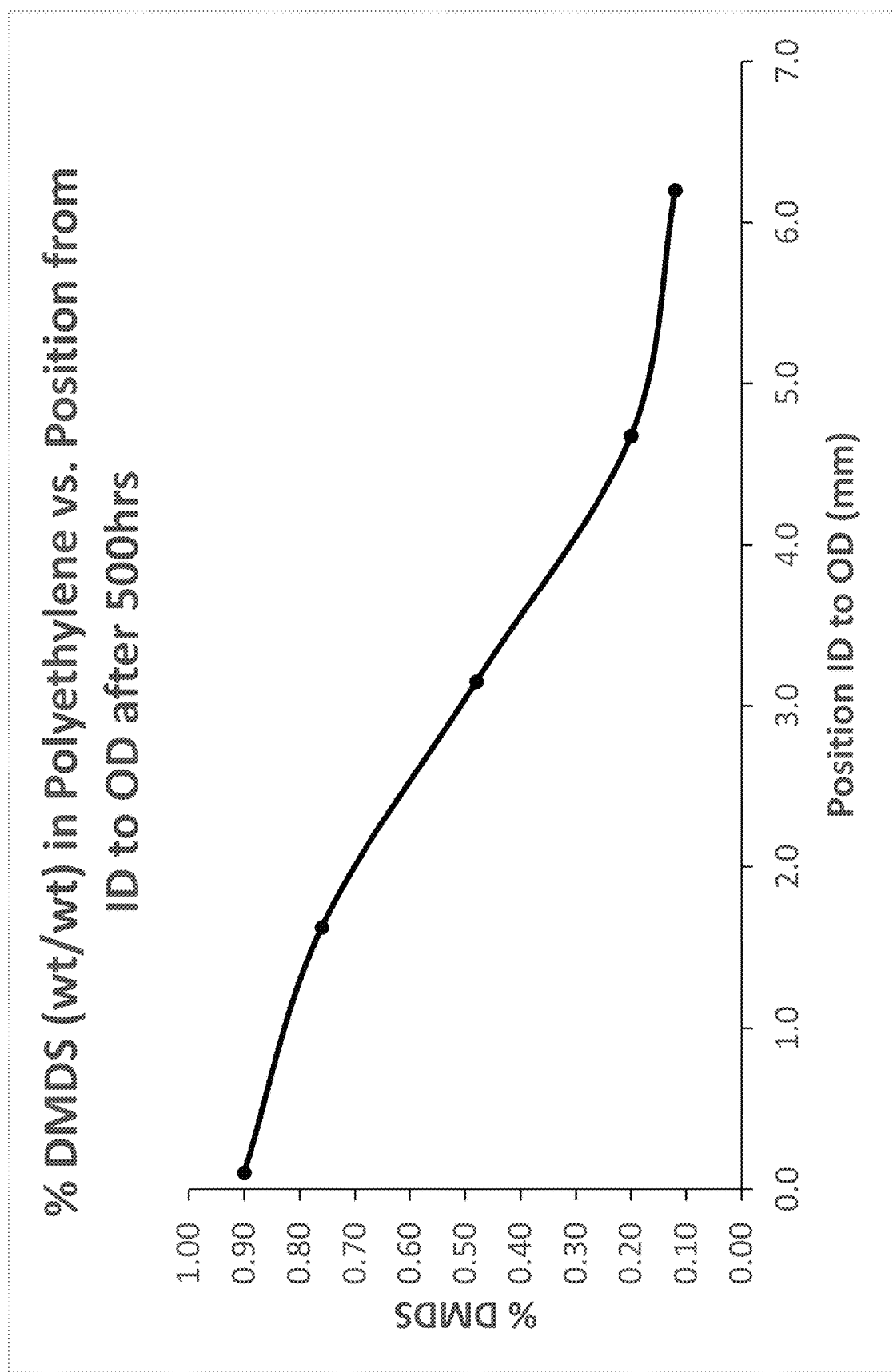
FIG. 14 illustrates the concentration profile of a treated cable at 500 hrs.

The treated cables were then placed in a 55° C. water bath for a period of 500 hours to accelerate the treatment of the insulation. To quantify the level of treatment of cable insulation, Fourier Transform Infrared spectroscopy (FTIR) was employed. FIG. 13 provides an illustrative example of the FTIR spectrographs for a cross-sectioned wafer of treated insulation and a similar but non-treated wafer of insulation. The graph measures the IR absorbance of chemical bonds. For silicone cable injection, the absorbance at 1260 cm$^{-1}$ is of particular interest as it represents the presence of Silicon-Carbon bonds. Comparison of the treated and non-treated sample at 1260 cm$^{-1}$ reveals the presence of silicone injection fluid. A quantitative routine that compares the peaks at 1260 cm-1 and 1308 cm$^{-1}$ may be performed to quantify the weight percent of the silicone injection fluid in the polyethylene insulation. The results of this quantification are shown in FIG. 14. For this illustrative example, a concentration profile between the inner conductor shield and outer insulation shield is measured at 5 discrete points. The profile depicts a common downward sloping concentration profile from an area of high silicone concentration at the conductor shield to a sink at the outer edge. For the profile measured at 500 hours, a peak value of 0.90 wt % was measured near the conductor shield interface dropping to near zero at the outer edge.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A method for rejuvenating a strand-blocked cable having a conductor comprised of a plurality of conductor strands with interstitial volume therebetween blocked by a PIB based mastic, the conductor being surrounded by a polymeric cable insulation, comprising:
   installing injection adapters that seal the cable ends of the cable and are usable to inject fluid into the interstitial volume between the conductor strands of the cable;
   elastically expanding the polymeric cable insulation through the application of pressure to the interstitial volume between the conductor strands of the cable;
   injecting at least one injection fluid in which the PIB based mastic is at least partially soluble into the interstitial volume between the conductor strands of the cable; and
   flushing the at least one injection fluid through the interstitial volume of the conductor strands to create at least 10% more interstitial volume by removing PIB based mastic.

2. The method of claim 1, further including heating the cable to a cable temperature of T1 above ambient T0 and maintaining the cable at least at cable temperature T1 during injection of the at least one injection fluid into the interstitial volume between the conductor strands of the cable, whereby elastic deformation of the polymeric cable insulation is facilitated.

3. The method of claim 2, wherein the cable temperature T1 is at least 20° C. above ambient T0, and pressure P1 is applied to the interstitial volume between the conductor strands of the cable, pressure P1 being less than the elastic limit of the polymeric cable insulation at cable temperature T1 but greater than 25% of the elastic limit of the cable at cable temperature T1.

4. The method of claim 2, wherein the cable temperature is increased to cable temperature T2 and the pressure is reduced to pressure P2 once the at least one injection fluid fills the interstitial volume between the conductor strands of the conductor, cable temperature T2 being greater than or equal to cable temperature T1 and pressure P2 being less than the elastic limit of the cable at cable temperature T2.

5. The method of claim 1, wherein at least one component of the at least one injection fluid is selected from one of the families of butoxy-silanes, propoxy-silanes, ethoxy-silanes, and methoxy-silanes.

6. The method of claim 1, wherein at least one component of the at least one injection fluid is selected from one of the families of diorganodibutoxysilanes, diorganodipropoxysilanes, diorganodiethoxysilanes, or diorganidimethoxysilanes.

7. The method of claim 6, wherein the at least one injection fluid is comprised of at least one water condensable silane in which PIB is at least partially soluble and a hydrolysis condensation catalyst.

8. The method of claim 7, wherein the at least one water condensable silane is one of dimethyldimethoxysilane (DMDM), dimethyldi-n-butoxysilane (DMDB), tolylethyl-methyldi-n-butoxysilane (TEMDB), Di-i-propyldimethoxysilane (DPrDM), Di-n-butyldimethoxysilane (DBDM), and tolylethylmethyldimethoxysilane (TEM).

9. The method of claim 1, wherein the solubility of the PIB portion of the PIB based mastic in the at least one injection fluid is between 1 and 50 wt % at 55° C.

10. The method of claim 1, wherein the solubility of the PIB portion of the PIB based mastic in the at least one injection fluid is between 5 and 20 wt % at 55° C.

11. The method of claim 1, wherein the at least one injection fluid has a viscosity of less than 3 cSt at 20° C. with 0 wt % of the PIB based mastic dissolved.

12. The method of claim 1, wherein the at least one injection fluid has a viscosity of less than 20 cSt at 20° C. with 15 wt % PIB base mastic dissolved.

13. The method of claim 1, wherein the injection adapters accommodate at least 0.8% radial thermal expansion of the polymeric cable insulation.

14. A method for rejuvenating a strand-blocked cable having a conductor comprised of a plurality of conductor strands with interstitial volume therebetween blocked by a PIB based mastic, the conductor being surrounded by a polymeric cable insulation, comprising:
   installing injection adapters that seal the cable ends of the cable and are usable to inject fluid into the interstitial volume between the conductor strands of the cable;
   elastically expanding the polymeric cable insulation through the application of pressure to the interstitial volume between the conductor strands of the cable; and
   injecting at least one injection fluid in which the PIB based mastic is at least partially soluble into the interstitial volume between the conductor strands of the cable, wherein the at least one injection fluid contains an organic peroxide.

15. A method for rejuvenating a strand-blocked cable having a conductor comprised of a plurality of conductor strands with interstitial volume therebetween blocked by a PIB based mastic, the conductor being surrounded by a polymeric cable insulation, comprising:
  installing injection adapters that seal the cable ends of the cable and are usable to inject fluid into the interstitial volume between the conductor strands of the cable;
  elastically expanding the polymeric cable insulation through the application of pressure to the interstitial volume between the conductor strands of the cable; and
  injecting at least one injection fluid in which the PIB based mastic is at least partially soluble into the interstitial volume between the conductor strands of the cable, wherein the at least one injection fluid contains an aryl peroxide.

16. The method of claim 15, wherein the at least one injection fluid contains di-cumyl peroxide between 0 and 10% by weight.

17. A method for rejuvenating a strand-block cable having a conductor comprised of a plurality of conductor strands with interstitial volume therebetween blocked by a PIB based mastic, the conductor being surrounded by a polymeric cable insulation, comprising:
  injecting at least one injection fluid in which the PIB based mastic is at least partially soluble into the interstitial volume between the conductor strands of the cable, wherein the at least one injection fluid contains an organic peroxide.

18. A method for rejuvenating a strand-block cable having a conductor comprised of a plurality of conductor strands with interstitial volume therebetween blocked by a PIB based mastic, the conductor being surrounded by a polymeric cable insulation, comprising:
  injecting at least one injection fluid in which the PIB based mastic is at least partially soluble into the interstitial volume between the conductor strands of the cable, wherein the at least one injection fluid contains an aryl peroxide.

19. The method of claim 18, wherein the at least one injection fluid contains di-cumyl peroxide between 0 and 10% by weight.

20. A method for rejuvenating a strand-block cable having a conductor comprised of a plurality of conductor strands with interstitial volume therebetween blocked by a PIB based mastic, the conductor being surrounded by a polymeric cable insulation, comprising:
  injecting at least one injection fluid in which the PIB based mastic is at least partially soluble into the interstitial volume between the conductor strands of the cable, further including flushing the at least one injection fluid through the interstitial volume of the conductor strands to create at least 10% more interstitial volume by removing PIB based mastic.

* * * * *